US012221260B2

(12) United States Patent
Goodrich

(10) Patent No.: US 12,221,260 B2
(45) **Date of Patent: *Feb. 11, 2025**

(54) EXPANDED SLIT SHEET CUSHIONING PRODUCTS WITH NOVEL REDUCED DIMENSION SLIT PATTERNS

(71) Applicant: HEXCELPACK, LLC, Sedona, AZ (US)

(72) Inventor: David Paul Goodrich, Sedona, AZ (US)

(73) Assignee: HexcelPack, LLC, Sedona, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,260

(22) Filed: May 25, 2023

(65) Prior Publication Data

US 2023/0294891 A1 Sep. 21, 2023

Related U.S. Application Data

(63) Continuation of application No. 16/501,137, filed on Jan. 6, 2021, now Pat. No. 11,702,261, which is a (Continued)

(51) Int. Cl.

*B65D 81/03* (2006.01)
*B31D 3/02* (2006.01)

(Continued)

(52) U.S. Cl.

CPC ........... *B65D 65/22* (2013.01); *B31D 3/0207* (2013.01); *B31D 3/0292* (2013.01); *B31D 3/04* (2013.01);

(Continued)

(58) Field of Classification Search

None

See application file for complete search history.

(56) References Cited

U.S. PATENT DOCUMENTS

| | | | |
|---|---|---|---|
| 1,999,282 | A | 4/1935 | Clemens |
| 2,624,245 | A | 1/1953 | Cluett |

(Continued)

FOREIGN PATENT DOCUMENTS

| | | | |
|---|---|---|---|
| CA | 2251477 | A1 | 10/1997 |
| CH | 337723 | A | 4/1959 |

(Continued)

OTHER PUBLICATIONS

Van Eperen, Roger, The effect of testing procedures on tensile strength and tear resistance of shipping bag kraft paper, Sep. 2004 (date available) (Year:2004). (Cited in parent U.S. Appl. No. 16/501,137).

(Continued)

*Primary Examiner* — Jeffrey A Vonch

(74) *Attorney, Agent, or Firm* — Studebaker Brackett PC

(57) ABSTRACT

In the preferred embodiments, the present invention provides substantially improved slit sheet cushioning products by advantageously combining novel paper properties with novel slit patterns for improved features and characteristics. In some illustrative and non-limiting example embodiments, cushioning products of the present invention can include, e.g., a novel slit sheet material in combination with extensible paper employed as, e.g., a cushioning pad or as cushioning within an envelope product, wherein the cushioning product can be substantially more resilient, but, yet, e.g., thinner for better utilization of space.

27 Claims, 18 Drawing Sheets

Related U.S. Application Data continuation-in-part of application No. 16/929,836, filed on Jul. 15, 2020, now Pat. No. 11,401,090, which is a continuation-in-part of application No. 16/872,813, filed on May 12, 2020, now Pat. No. 11,383,906, which is a continuation of application No. 16/018,702, filed on Jun. 26, 2018, now Pat. No. 10,669,086.

(60) Provisional application No. 62/874,163, filed on Jul. 15, 2019, provisional application No. 62/524,905, filed on Jun. 26, 2017.

(51) Int. Cl.

| | |
|---|---|
| ***B31D 3/04*** | (2006.01) |
| ***B31D 5/00*** | (2017.01) |
| ***B32B 3/12*** | (2006.01) |
| ***B32B 3/24*** | (2006.01) |
| ***B32B 29/00*** | (2006.01) |
| ***B65D 65/22*** | (2006.01) |
| ***B65D 85/672*** | (2006.01) |
| ***D21H 25/00*** | (2006.01) |
| ***D21H 27/00*** | (2006.01) |
| ***D21H 27/10*** | (2006.01) |
| *B31D 1/00* | (2017.01) |
| *B65B 55/20* | (2006.01) |

(52) U.S. Cl.

CPC ........... *B31D 5/006* (2013.01); *B31D 5/0065* (2013.01); *B31D 5/0069* (2013.01); *B65D 81/03* (2013.01); *B65D 85/672* (2013.01); *D21H 5/24* (2013.01); *D21H 5/245* (2013.01); *D21H 27/10* (2013.01); *B31D 1/0031* (2013.01); *B31D 2205/0023* (2013.01); *B65B 55/20* (2013.01); *D21H 25/005* (2013.01); *Y10T 428/24298* (2015.01); *Y10T 428/24306* (2015.01); *Y10T 428/24314* (2015.01)

(56) References Cited

U.S. PATENT DOCUMENTS

| | | | |
|---|---|---|---|
| 2,996,425 | A | 8/1961 | Hamilton |
| 3,104,197 | A | 9/1963 | Sangho et al. |
| 3,220,116 | A | 11/1965 | Freuler |
| 3,266,972 | A | 8/1966 | Cramer et al. |
| 3,269,393 | A | 8/1966 | Ackermann |
| 3,329,562 | A | 7/1967 | Schaefer |
| 3,357,172 | A | 12/1967 | Evans |
| 3,523,865 | A | 8/1970 | Ihrman |
| 3,762,629 | A | 10/1973 | Bruno |
| 3,908,071 | A | 9/1975 | Heim et al. |
| 4,040,899 | A | 8/1977 | Emerson |
| 4,105,724 | A | 8/1978 | Talbot |
| 4,230,036 | A | 10/1980 | Groome |
| 4,832,228 | A | 5/1989 | Hickey |
| 5,001,017 | A | 3/1991 | Alhamad et al. |
| 5,365,819 | A | 11/1994 | Maida et al. |
| 5,538,778 | A | 7/1996 | Hurwitz et al. |
| 5,544,473 | A | 8/1996 | Maida et al. |
| 5,667,135 | A | 9/1997 | Schaefer |
| 5,667,871 | A | 9/1997 | Goodrich et al. |
| 5,688,578 | A | 11/1997 | Goodrich |
| 5,782,735 | A | 7/1998 | Goodrich et al. |
| 5,894,044 | A | 4/1999 | Norcom et al. |
| 6,024,832 | A | 2/2000 | Trani et al. |
| 6,117,062 | A | 9/2000 | Alhamad |
| 6,416,623 | B1 | 7/2002 | Hollmark et al. |
| 6,458,447 | B1 | 10/2002 | Cabell et al. |
| 6,712,930 | B2 | 3/2004 | Koivukunnas |
| 6,989,075 | B1 | 1/2006 | Kao et al. |
| 7,918,966 | B2 | 4/2011 | Trani et al. |
| 8,518,522 | B2 | 8/2013 | Trani et al. |
| 9,945,077 | B2 | 4/2018 | Hashiguchi et al. |
| 10,226,907 | B2 | 3/2019 | Goodrich |
| 10,669,086 | B2 | 6/2020 | Goodrich |
| 10,981,712 | B2 | 4/2021 | Goodrich |
| 2002/0060034 | A1 | 5/2002 | Hollmark et al. |
| 2002/0174630 | A1 | 11/2002 | Goodrich |
| 2004/0056080 | A1 | 3/2004 | Johansson et al. |
| 2004/0076798 | A1 | 4/2004 | Larsson et al. |
| 2007/0240841 | A1 | 10/2007 | Trani et al. |
| 2010/0196633 | A1 | 8/2010 | Kuchar |
| 2012/0248177 | A1 | 10/2012 | Beaulieu et al. |
| 2012/0266568 | A1 | 10/2012 | Prud'homme et al. |
| 2014/0166661 | A1 | 6/2014 | Goodrich |
| 2014/0329049 | A1 | 11/2014 | Zhang |
| 2015/0122866 | A1 | 5/2015 | Kuchar et al. |
| 2015/0140265 | A1 | 5/2015 | Page et al. |
| 2015/0151895 | A1 | 6/2015 | Zhang |
| 2015/0176303 | A1 | 6/2015 | Kuchar et al. |
| 2016/0067938 | A1 | 3/2016 | Goodrich |
| 2016/0355985 | A1 | 12/2016 | Hashiguchi et al. |
| 2017/0107017 | A1 | 4/2017 | Kuchar et al. |
| 2017/0203866 | A1 | 7/2017 | Goodrich |
| 2017/0313017 | A1 | 11/2017 | Cheich et al. |
| 2017/0341845 | A1 | 11/2017 | Mulvey et al. |
| 2018/0022266 | A1 | 1/2018 | Tzeng |
| 2018/0079161 | A1 | 3/2018 | Cheich |
| 2018/0127197 | A1 | 5/2018 | Goodrich |
| 2018/0222665 | A1 | 8/2018 | Goodrich |
| 2018/0229910 | A1 | 8/2018 | Kohn et al. |
| 2018/0370702 | A1 | 12/2018 | Goodrich |
| 2019/0100369 | A1 | 4/2019 | Hoffman et al. |
| 2020/0270048 | A1 | 8/2020 | Goodrich |
| 2021/0101356 | A1 | 4/2021 | Cheich et al. |
| 2021/0206535 | A1 | 7/2021 | Yan |
| 2021/0221567 | A1 | 7/2021 | Yan |
| 2022/0002059 | A1 | 1/2022 | Asayama |
| 2022/0106093 | A1 | 4/2022 | Parker et al. |

FOREIGN PATENT DOCUMENTS

| | | | |
|---|---|---|---|
| CN | 1134687 | A | 10/1996 |
| CN | 1152274 | A | 6/1997 |
| CN | 201990066 | U | 9/2011 |
| CN | 202244644 | U | 5/2012 |
| CN | 102733266 | A | 10/2012 |
| CN | 109878897 | A | 6/2019 |
| DE | 4340531 | A1 | 6/1994 |
| GB | 951132 | A | 3/1964 |
| GB | 1534342 | A | 12/1978 |
| JP | S36-4149 | B | 4/1961 |
| JP | S50-065388 | A | 6/1975 |
| JP | S50-098194 | U | 8/1975 |
| JP | H01-226574 | A | 9/1989 |
| JP | H04-050647 | U | 4/1992 |
| JP | 1993286023 | A | 11/1993 |
| JP | H06-320647 | A | 11/1994 |
| JP | 1995502718 | | 3/1995 |
| JP | H07-502718 | A | 3/1995 |
| JP | H08-119334 | A | 5/1996 |
| JP | H09-328170 | A | 12/1997 |
| JP | H10-297676 | A | 11/1998 |
| JP | 3091247 | B2 | 9/2000 |
| JP | 2001277380 | A | 10/2001 |
| JP | 2004017408 | A | 1/2004 |
| JP | 2005047149 | A | 2/2005 |
| JP | 3108709 | U | 4/2005 |
| JP | 2005-178834 | A | 7/2005 |
| JP | 2006-290356 | A | 10/2006 |
| JP | 2010-269803 | A | 12/2010 |
| JP | 3165722 | U | 2/2011 |
| JP | 2015-017336 | A | 1/2015 |
| JP | 2017-193373 | A | 10/2017 |
| JP | 2017-193376 | A | 10/2017 |
| JP | 2017-226476 | A | 12/2017 |
| JP | 2019-031012 | A | 2/2019 |
| JP | 2019-031013 | A | 2/2019 |
| JP | 2019-031303 | A | 2/2019 |
| JP | 2019-099223 | A | 6/2019 |

(56) References Cited

FOREIGN PATENT DOCUMENTS

| | | | |
|---|---|---|---|
| JP | 2019-099231 | A | 6/2019 |
| WO | 1984002936 | A1 | 8/1984 |
| WO | 9318911 | A1 | 9/1993 |
| WO | 9601731 | A1 | 1/1996 |
| WO | 9624540 | A1 | 8/1996 |
| WO | 0126889 | A1 | 4/2001 |
| WO | 2010101232 | A1 | 9/2010 |
| WO | 2015/036335 | A1 | 3/2015 |
| WO | 2015035335 | A1 | 3/2015 |
| WO | 2018/191012 | A1 | 10/2018 |
| WO | 2019005739 | A1 | 1/2019 |
| WO | 2020/033275 | A1 | 2/2020 |
| WO | 2020/0166893 | A1 | 8/2020 |
| WO | 2021/011626 | A1 | 1/2021 |
| WO | 2021/130612 | A1 | 7/2021 |
| WO | 2021/130628 | A1 | 7/2021 |
| WO | 2021/161910 | A1 | 8/2021 |
| WO | 2021/163453 | A1 | 8/2021 |

OTHER PUBLICATIONS

Dumbleton, David P., Longitudinal compression of individual pulp fibers, Mar. 2005 (date available) (Year: 2005). (Cited in parent U.S. Appl. No. 16/501,137).
Vishtal et al., Boosting the Extensibility Potential of Fibre Networks: A Review, 2014, BioResources, vol. 9, No. 4 (Year: 2014).
R.S. Seth Pulp & Paper Canada T31, 106:2 (2005) III, pp. 33-40 (T31-T38). (Cited in parent U.S. Appl. No. 16/501,137).
International Search Report and Written Opinion in Related PCT Application No. PCT/2018/39416, dated Nov. 20, 2018. (Cited in parent U.S. Appl. No. 16/501,137).
International Search Report dated Nov. 20, 2018, issued in application No. PCT/US18/39416 (counterpart to US application No. PCT/US2018/039416). (5 pages). (Cited in parent U.S. Appl. No. 16/501,137).
International Search Report dated Oct. 25, 1995, issued in counterpart GB Application No. PCT/GB95/01578 (2 pages). (Cited in parent U.S. Appl. No. 16/501,137).
International Search Report dated Jul. 2, 1993, issued in counterpart Application No. PCT/US93/02369 (3 pages). (Cited in parent U.S. Appl. No. 16/501,137).
International Search Report dated Jun. 6, 1996, issued in counterpart Application No. PCT/US96/01743 (4 pages). (Cited in parent U.S. Appl. No. 16/501,137).
Diaz, "Clupak Paper—A New Type of High-Stretch Paper—Its Manufacture and Performance," 1959, ASTM International in Symposium on Paper and Paper Products—New Developments with Accompanying Requirements for New Testing Methods (Year: 1959) (Cited in parent U.S. Appl. No. 16/501,137).
Extended Search Report dated Feb. 25, 2021, issued in counterpart EP Application No. 19764975.9 (7 pages). (Cited in parent U.S. Appl. No. 16/501,137).
Office Action dated Oct. 21, 2020, issued in counterpart AU Application No. 2018290739 (4 pages). (Cited in parent U.S. Appl. No. 16/501,137).
Office Action dated Mar. 2, 2021, issued in counterpart JP Application No. 2020-520433, with English translation (22 pages). (Cited in parent U.S. Appl. No. 16/501,137).
English Translation of Office Action dated Apr. 2, 2021, issued in counterpart CN Application No. 201880054670.8. (11 pages). (Cited in parent U.S. Appl. No. 16/501,137).
Office Action dated Mar. 26, 2021, issued in counterpart CA Application No. 3,067,852. (4 pages). (Cited in parent U.S. Appl. No. 16/501,137).
Office Action dated Jul. 22, 2021, issued in counterpart IN Application No. 202017001425, with English Translation. (7 pages). (Cited in parent U.S. Appl. No. 16/501,137).
Office Action dated Oct. 12, 2021, issued in counterpart JP Application No. 2020-520433, with English Translation. (17 pages). (Cited in parent U.S. Appl. No. 16/501,137).
Office Action dated Dec. 23, 2021, issued in counterpart EP application No. 18 822 784.7. (5 pages). (Cited in parent U.S. Appl. No. 16/501,137).
An Office Action mailed by China National Intellectual Property Administration dated Mar. 17, 2022, which corresponds to Chinese Patent Application No. 201880054670.8 and is related to U.S. Appl. No. 16/872,813; with English language translation (no newly cited references). (Cited in parent U.S. Appl. No. 16/501,137).
An Office Action mailed by the Korean Intellectual Property Office dated Mar. 30, 2022, which corresponds to Korean 2 Patent Application No. 10-2021-7039059 and is related to U.S. Appl. No. 16/872,813; with English language translation (no newly cited references). (Cited in parent U.S. Appl. No. 16/501,137).
Notification Concerning Transmittal of International Preliminary Report on Patentability (Forms PCT/IB/326) issued in counterpart International Application No. PCT/US2020/042093 dated Jan. 27, 2022, with Forms PCT/IB/373 and PCT/ISA/237. (21 pages). (Cited in parent U.S. Appl. No. 16/501,137).
Written Opinion and International Search report dated Nov. 4, 2020, issued in counterpart Application No. PCT/US2020/042093. (33 pages). (Cited in parent U.S. Appl. No. 16/501,137).
PCT Written Opinion and Search Report from corresponding PCT/US2022/011426, dated Aug. 24, 2022. (Cited in parent U.S. Appl. No. 16/501,137).
International Preliminary Report on Patentability and Written Opinion from corresponding PCT/US2022/011426, issued Jul. 4, 2023.
An Office Action issued by the Canadian Intellectual Property Office on Jan. 25, 2024, which corresponds to Canadian Patent Application No. 3,144,170 and is related to U.S. Appl. No. 18/202,260.
An Office Action issued by the Chinese Patent Office on Aug. 25, 2023, which corresponds to Chinese Patent Application No. 202080064508.1 and is related to U.S. Appl. No. 18/202,260.
A Preliminary Office Action published in the Brazilian Industrial Property Journal No. 2763 on Dec. 19, 2023, which corresponds to Brazilian Patent Application No. BR112022000769-8 and is related to U.S. Appl. No. 18/202,260.
A Hearing Notice issued by the Indian Patent Office on Dec. 21, 2023, which corresponds to Indian Patent Application No. 202017001425 and is related to U.S. Appl. No. 18/202,260.
An Office Action issued by the Chinese Intellectual Property Office on May 20, 2024, which corresponds to Chinese Patent Application No. 202080064508.1 and is related to U.S. Appl. No. 18/141,860. (US5782735A and US2018370702A1 were previously cited on Jul. 26, 2023.).
Office Action dated May 30, 2023 in divisional Japanese Patent Application 2023-008664 (with English Translation), which is a divisional from issued Japanese Patent Nos. 7217786 and 7153720.
An Office Action issued by the Japanese Patent Office on Jun. 25, 2024, which corresponds to Japanese Patent Application No. 2022-502290 and is related to U.S. Appl. No. 18/202,260. (US 2018/370702 A1 was previously cited on Jul. 26, 2023.).
Invalidity contentions filed in *HexcelPack, LLC* v. *Pregis LLC*, Case No. 23-cv-15282, Northern District of Illinois regarding related U.S. Pat. Nos. 10,669,086, 11,383,906 and 11,760,548 (Feb. 22, 2024).
The extended European Search Report issued by the European Patent Office on Nov. 11, 2024, which corresponds to European Patent Application No, 22737096.2-1014 and is related to U.S. Appl. No. 18/202,260 (All other references cited in the European Search Report were previously filed this application.).

FIG.7(A)
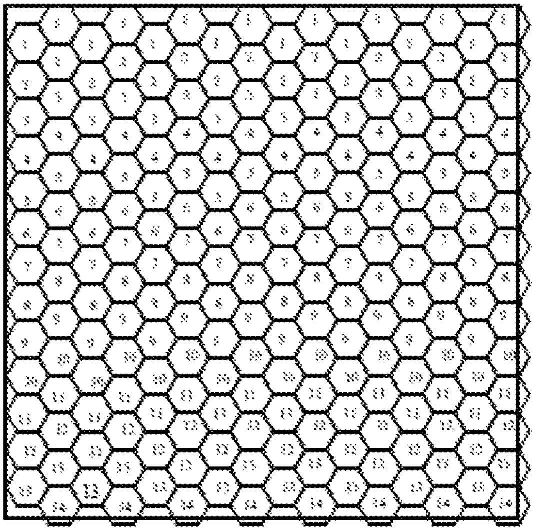
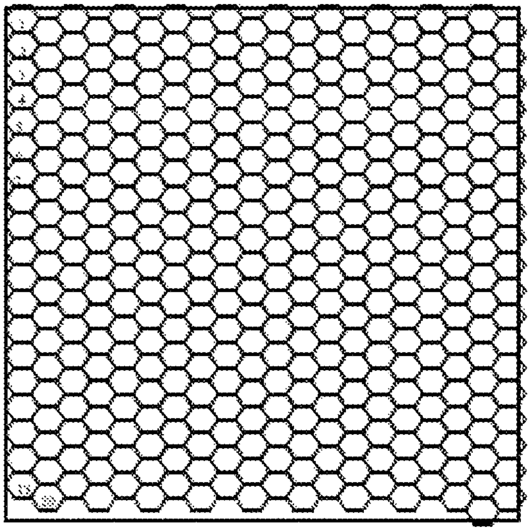
FIG. 7(B)

FIG.8(A)
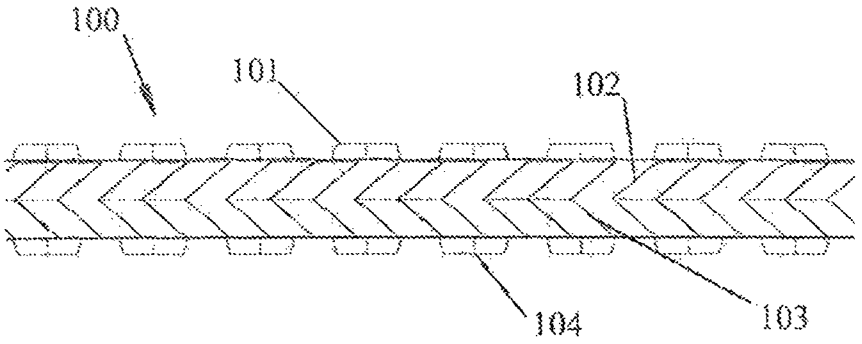
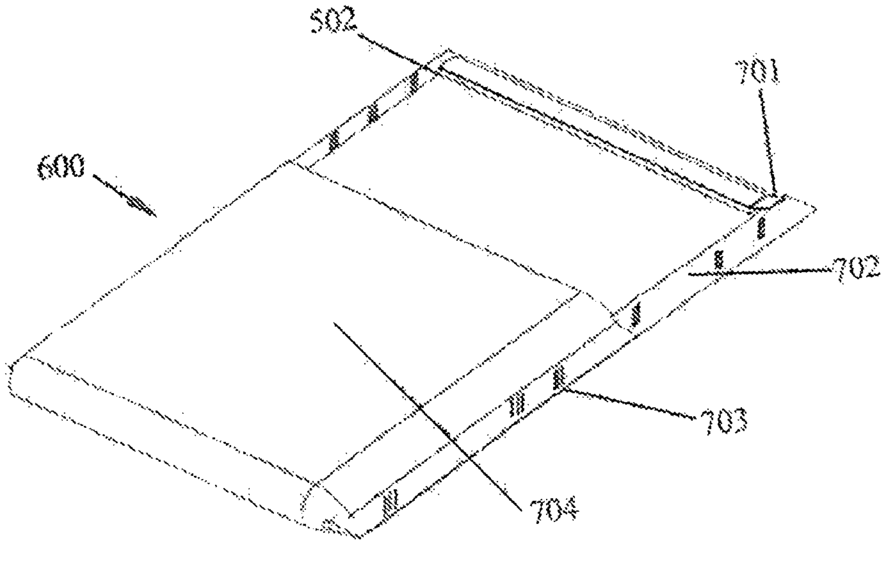
FIG. 8(B)

EXPANDED SLIT SHEET CUSHIONING PRODUCTS WITH NOVEL REDUCED DIMENSION SLIT PATTERNS

This application is a continuation of U.S. Ser. No. 16/501,137, filed on Jan. 6, 2021, which is; a continuation-in-part of U.S. Ser. No. 16/929,836, filed Jul. 15, 2020, which is a non-provisional of U.S. Provisional Application No. 62/874,163, filed Jul. 15, 2019, which U.S. Ser. No. 16/929,836 is also a continuation-in-part of U.S. application Ser. No. 16/872,813, filed May 12, 2020, which is a continuation of U.S. application Ser. No. 16/018,702, filed Jun. 26, 2020, now U.S. Pat. No. 10,669,086, which claims priority to U.S. Provisional Application No. 62/524,905, filed Jun. 26, 2017. The entire disclosures of each of the above-listed priority applications are incorporated herein by references as though recited herein in full.

CROSS-REFERENCES TO PATENTS AND PATENT APPLICATIONS INCORPORATED BY REFERENCE

The entire disclosures of a) U.S. Pat. No. 10,669,086, issued Jun. 2, 2020, b), c) U.S. Pat. No. 10,226,907, issued on Mar. 12, 2019, d) U.S. application Ser. No. 16/274,028, filed Feb. 12, 2019, as a divisional of U.S. Pat. No. 10,226,907, and e) Ser. No. 16/870,195, filed May 8, 2020, entitled "Extensible Paper and its Use in the Production of Expanded Slit Packaging Wrap and Void Fill Products" are each incorporated by reference herein in their entireties, as though recited in full herein.

BACKGROUND

Field

This invention relates to the use of slit sheet material that is expanded to provide a cushioning product. In the preferred embodiments, the present invention provides substantially improved slit sheet cushioning products by advantageously combining novel paper properties with novel slit patterns for improved features and characteristics. In some illustrative and non-limiting example embodiments, cushioning products of the present invention can include, e.g., a novel slit sheet material in combination with extensible paper employed as, e.g., a cushioning pad or as cushioning within an envelope product, wherein the cushioning product can be substantially more resilient, but, yet, e.g., thinner for better utilization of space.

Expanded Slit Sheet Paper Related Art Incorporated by Reference

Further information relating to the paper which can be used in the present invention, slit patterns, and the expansion process is found in U.S. Patents a) U.S. Pat. No. 5,538,778, b) U.S. Pat. No. 5,667,871, c) U.S. Pat. No. 5,688,578, d) U.S. Pat. No. 5,782,735, e) U.S. Pat. No. 3,908,071, f) U.S. Pat. No. 3,104,197, g) U.S. Pat. No. 3,220,116, h) U.S. Pat. No. 3,266,972, i) U.S. Pat. No. 3,269,393, j) U.S. Pat. No. 3,908,071, k) U.S. Pat. No. 6,024,832, l) U.S. Pat. No. 6,458,447 and m) U.S. Pat. No. 6,712,930, and in U.S. application Ser. No. 14/901,977, and in PCT application No. WO1984002936A1, and in U.S. Published Patent Application Nos. US 2002/0060034, US 2007/0240841, and the disclosures of which are all incorporated by reference herein in their entireties, as though recited in full herein.

In the preferred embodiments, the terminology "expandable" as applied to paper sheets, means a paper having a slit pattern that enables expansion of the paper, such as, e.g., as disclosed in U.S. Pat. Nos. (a) U.S. Pat. No. 5,538,778, (b) U.S. Pat. No. 5,667,871, (c) U.S. Pat. No. 5,688,578, (d) U.S. Pat. No. 5,782,735 and (e) U.S. Pat. No. 10,226,907, and in PCT Application No. PCT/US2014/054615, the entire disclosures of which patents and PCT application are all incorporated by reference herein as though recited in full. In the preferred embodiments, a slit pattern is configured to enable the paper to be expanded lengthwise, with a related decrease in width. In some embodiments, the slit pattern produces a paper that increases in length due to the slit pattern when processed in an expander, such as, e.g., an expander of the type described in any of the following U.S. and PCT applications (a) 2017/0203866, (b) 2018/022266, (c) 2018/0127197, and (d) PCT/US2014/054615, incorporated herein by reference in their entireties.

U.S. Pat. Nos. 5,667,871 and 5,688,578, slit Sheet Packing Material, teach the use of a plurality of individual slits forming parallel spaced rows forming a hexagonal expanded sheet with and without a separator sheet. It requires machinery to stretch the paper into its three-dimensional shape at the customer's location such as disclosed in U.S. Pat. No. 5,538,778 which teaches the method and apparatus for producing the expansion of the slit sheet material performed at the packing site's location. U.S. Pat. No. 5,782,735 discloses an expander for expanding the slit sheet material of U.S. Pat. Nos. 5,667,871 and 5,688,578.

For reference, FIGS. 3(A) and 3(B) correspond to FIGS. 1 and 3 of U.S. Pat. No. 5,667,871 (the '871 patent). These figures describe existing "slit sheet" expandable paper structure. As explained in the '871 patent:

"The slit paper, indicated generally as 10, is illustrated in FIG. [3(A)] as it would come off the slitting machine. The sheets can be formed on a flat-bed slitter and produced directly as rectangular sheets, as well as on a rotary slitter and cut into individual sheets or stored directly as a continuous sheet in roll form. The flexible sheet 10 is preferably manufactured from exclusively recycled paper with the grain of the paper running in the direction of arrow A. The flexible sheet 10 is provided with slits 14 and slits 16 are parallel to the edges 22 and 24 of the flexible sheet 12 and perpendicular to the paper grain. The slits 14 and slits 16 are placed in rows and separated from one another by land 20 and legs 21 [shown in FIG. 3(B)]. The land 20 is a consistent size and provides the support required to prevent the paper from tearing into strips when opened. The cushioning effect is produced by the flexing of the lands and legs under a load. It is therefore necessary that the land 20 be of sufficient size to provide cushioning. The spacing between the rows of slits 14 and slits 16 must also be of sufficient size to prevent the paper from tearing. The offset positioning of the rows of slits 14 and slits 16 gives the paper resiliency when opened and is discussed in detail further hereinafter. The existence of partial slits 14 and 16 at the ends 25 and 18 of the flexible sheet 10 do not hinder the efficiency of the slit paper 10. The flexible sheet 10 when flat; lies in a first plane."

"When expanded, the expanded sheet, indicated generally as 12, is formed of hexagonal cells 26, legs 21 and land 20 areas, as illustrated in FIG. [3(B)]. Preferably, at least a majority of the land 20 areas lie in a plurality of parallel planes. The planes of the land 20 areas form an angle of at least about 45 degrees with the plane of the sheet in flat form."

"The slitting operation in which the slits are cut into the sheet material can take several forms. In one embodiment, rectangular sheets are provide with its total number of slits in one action. The term rectangular should be understood to include rectangles in which all four sides are equal, that is, square. Where the sheet material is subjected to rotary cutting or slitting, the pressure required for the cutting action is significantly lower that which is required for the flat bed cut, since essentially only a single row or a few rows of slits are cut simultaneously. Unlike prior art structures and systems, expansion contemporaneous with slitting is not desirable. Therefore a critical balance must be struck between resistance to opening of the cells during the rewind step and ease of opening of cells during the expansion step. By achieving this critical balance and producing a flat, unexpanded sheet, the sheet material has an effective thickness which is as much as one twentieth of the thickness of a sheet of expanded material. The compact configuration provides for the optimization of shipping and storage."

In the preferred embodiments, the term "slit sheet" means an expandable paper sheet having a slit pattern. The following are direct quotes of U.S. Pat. No. 5,667,871 (the '871 patent).

First, column 10, lines 13-48, of the '871 patent explains:

"The length of the slit and the ratio of the land intervals between slit affects the dimensions of the polygons which are formed during the expansion step. The higher the ratio of slit length to interval length the greater is the maximum angle which can be formed between the plane of the sheet and the planes of the land areas. The greater the uniformity of the shape and size of the formed polygonal shaped open areas and the angle to which the land areas incline relative to the flat sheet, the greater is the degree to which interlocking of land areas can be achieved. Interlocking of land areas, that is, the nesting of layers of sheets, reduces the effective thickness of the sheets. However, the net effect is still a dramatic increase in effective sheet thickness. For example, 0.008 inch thick paper having a silt pattern of a ½" slit, 3/16" slit spacing, and ⅛" row spacing, produces a ¼" by 3/16" land which can expand to under about one quarter of an inch thickness and will have a net effective thickness for two layers, when nested, of about 0.375 inches. It is noted that the land width is double the width of the legs. The net effect is a useful thickness expansion of roughly 20 times the unexpanded thickness of the paper."

"The longer the slit relative to the rigidity of the sheet material, the weaker is the interlocking effect and the cushioning effect due to the weakness of the expanded structure. If the slits are too small, expansion can be severely limited and cushioning can be excessively limited. This does not mean that the dimensions are narrowly critical, but rather that the dimension must be selected relative to the characteristics of the paper, as for example the degree of rigidity, and the cushioning or energy absorbing effects which are required. The resistance to expansion increases relative to the increase in the size of the land areas. It should be understood that some resistance to opening is desired. The object rests on, or contacts the edge of the sheet formed by the incline of the land areas which turns the perimeter of the openings into upper and lower edges."

Second, column 10, lines 58-67 and column 11, lines 1-6, of the '871 patent further explains:

"As heretofore mentioned, the slit dimensions can be varied to ease the process of opening. A ⅝" slit, 3/16" land by 3/16 row opens very easily since the number of hexagons is reduced. When the size of the hexagons are increased and the numbers decreased; the stretched thickness was increased, producing a very viable wrap material. This sizing increases the yield of the paper and provides almost the same protection as the ½" slit. This sizing provides a less expensive product utilizing a larger content of post consumer waste while maintaining the integrity of the wrap product. The ½" slit, 3/16" land by ⅛" row pattern produces a more protective wrap due to the greater number of wraps that can be made within the same volume. Thus, a 2⅝ pound vase dropped from a thirty inch height, with only ½" of cumulative sheet thickness around the vase, can be protected with the ½" slit, ¼ by 3/16 inch land pattern."

The present inventor's prior U.S. Pat. No. 10,226,907 (the '907 patent) shows a background "Expandable Slit Sheet Packaging Material That Interlocks When Layered and Expanded." In the '907 patent, the product includes a plurality of layers, with each layer having a different slit pattern for the purposes of "interlocking" between the plural layers. As explained at column 2 of the '907 patent, "the differing slit patterns produce when expanded, inclined land area that have the same number of rows per inch, but different angles of inclination of the land areas, such that adjacent layers can interlock." While the '907 patent describes an example in which a slit length of 0.4 inches is included for one of the layers, it is notable that 1) this 0.4 inch slit length is only used in conjunction with an adjacent layer having a larger slit length of 0.5 inches, 2) this reduced slit length is not used along with a reduced distance between rows (i.e., the distance between rows is required to be the same as that of the adjacent layer with the 0.5 inch slit length). Thus, the '907 patent does not teach the improved slit sheet cushioning products of the present invention, nor the advantages therefrom.

The preferred embodiments of the present invention improve upon and overcome various problems and limitations of the related art.

SUMMARY

The preferred embodiments overcome and improve upon the foregoing and/or other related art. In accordance with some embodiments of the invention, the use of a slit pattern that creates more cells per square foot provides a greater crush resistance and resiliency for cushioning the items packed within as a wrap or when being used as a pad for an envelope (including, in some illustrative preferred envelope embodiments, wherein the envelope includes at least an inner or outer layer of indented paper).

In the most preferred embodiments, an expanded paper cushioning product is provided that employs an improved slit arrangement, and wherein the expanded paper is an extensible paper.

In some preferred embodiments of the invention, the present invention can comprise features of one or more of the claims 1-81 set forth at the end of this application.

In some preferred embodiments, the slit paper pattern of slits advantageously has slits in the range from 0.2 to 0.3 inches (i.e., in the lengthwise dimension of the slits) and spaces between rows in the range from 0.06 to 0.7 inches (i.e., the distance between adjacent rows of slits). Preferably, the slit paper pattern of slits advantageously has slits of about 0.25 inches (i.e., in the lengthwise dimension of the slits) and spaces between rows of about 0.06 to about 0.065 inches (i.e., the distance between adjacent rows of slits) and most preferably spaces between rows of about 0.0625 inches.

Preferably the space between the slits of each row is in the range from about 0.1 to about 0.09 inches and most preferably, the space between the slits of each row is about 0.094 inches.

The foregoing dimensions produce a slit pattern that creates more cells per square foot, provides crush resistance and resiliency for cushioning the items packed within an envelope while providing a thin envelope. In some preferred embodiments, the term "thin envelope" as employed herein refers to a distance between the outermost layers of the envelope in the pouch area 704.

Advantageously, in the preferred embodiments, these embodiments are made from an extensible paper.

In some preferred embodiments, the slit paper pattern of slits advantageously has slits in the range from 0.30 to 0.45 inches (i.e., in the lengthwise dimension of the slits) and spaces between rows in the range from 0.1125 to 0.1688 inches (i.e., the distance between adjacent rows of slits). Most preferably, these latter embodiments are made from an extensible paper.

In some preferred embodiments, the slit paper has slits wherein the slit width is 0.45 inches plus 5%, minus 33% (i.e., here the slit width refers to the lengthwise dimension of the slits). Most preferably, again, these latter embodiments are made from an extensible paper.

In some preferred embodiments, the slit pattern advantageously produces an expandable slit paper having a number of legs per square foot that is at least 20% greater than slit paper has slit (cut) widths of 0.5 inches.

In some preferred embodiments, an expanded slit paper cushioning product of the present invention has a number of legs per square foot that is at least 15% greater than slit paper that has slit (cut) widths of 0.5 inches. In some preferred embodiments, an expanded slit paper cushioning product of the present invention has such a number of legs per square foot that is in the range from 20% to 50% greater than that of slit paper having slit (cut) widths of 0.5 inches.

Additionally, while the present inventor has discovered novel means to improve cushioning characteristics of expandable slit sheet paper, which involves "reducing" the slit pattern dimensions, it is notable that this reduction of slit pattern dimensions is "not only" unviable with prior expandable slit sheet paper (i.e., which could not achieve such small sizes), but is also "counter-intuitive" to the existing understanding of cushioning properties afforded by such expandable slit sheet papers. Notably, the cushioning of expandable slit sheet papers is directly related to the "width" of the expandable slit sheet paper in an expanded state. Accordingly, for enhancing cushioning, those in the art have sought to actually "increase" this width of the expanded slit sheet paper. However, the present inventor discovered means by which smaller slit patterns could be achieved (e.g., via the use of the extensible paper) and that such smaller slit patterns with such extensible papers could, in fact, provide enhance cushioning despite the losses in cushioning due to the reduced "width" of the expandable slit sheet paper. Additionally, the present inventor also discovered other desirable applications and uses of such novel expandable slit sheet paper.

According to some preferred embodiments, a slit sheet paper cushioning product is provided that includes: a slit sheet paper having a slit pattern including a plurality of slits extending in a cross direction that forms a plurality of open cells upon expansion in a machine direction, wherein the slit width is from 0.45 inches plus 5% to 0.45 inches minus 33%, and said slit sheet paper being formed from an extensible paper made to be extensible in the machine direction and the cross direction without said slit pattern, said extensible paper having an extensibility within a range of 3 to 20% in the machine direction.

According to some embodiments of the invention, a slit sheet paper cushioning product is provided that includes: a sheet paper having a slit pattern including a plurality of slits extending in a cross direction that forms a plurality of open cells upon expansion in a machine direction, wherein the slit width is at least 10% less than 0.5 inches, and said slit sheet paper being formed from an extensible paper made to be extensible in the machine direction and the cross direction without said slit pattern, said extensible paper having an extensibility within a range of 3 to 20% in the machine direction.

According to some preferred embodiments, a slit sheet paper cushioning product is provided that includes: at least one slit sheet paper having a slit pattern including a plurality of slits extending in a cross direction that forms a plurality of open cells upon expansion in a machine direction, wherein the slit width is at least 10% less than 0.5 inches, and said slit sheet paper being formed from an expandable paper that expands into an alternating row expansion pattern that includes alternating rows with bottom-side cell openings in bottom-side rows situated on a bottom side of the expanded slit sheet paper and with top-side cell openings in top-side rows situated on a top side of the expanded slit sheet paper. According to some embodiments, the slit sheet paper is made with an extensible paper. According to some embodiments, the extensible paper is extensible in a machine direction in a range of at least 5%. According to some embodiments, the extensible paper is extensible in a cross direction in a range of at least 5%. According to some embodiments, the extensible paper is extensible in the machine direction and the cross direction without said slit pattern, said extensible paper having an extensibility within a range of 3 to 20% in the machine direction.

In some embodiments, the slit sheet includes spaces between rows of slits in the range of 0.1125 to 0.1688 inches. In some embodiments, the slit sheet includes spaces between rows of slits smaller than 0.125 inches. In some embodiments, the slit sheet includes spaces between rows of slits smaller than 0.1125 inches. In some embodiments, the slit sheet includes spaces between rows of slits smaller than 0.0875 inches. In some embodiments, the slit width is less than 0.40 inches. In some embodiments, the slit width is less than 0.35 inches. In some embodiments, the slit width is less than 0.30 inches.

In some embodiments, the slit sheet paper is a roll of slit sheet paper. In some embodiments, the roll of slit sheet paper is supported on an expander device adapted to rotatably support the roll of slit sheet paper for manual removal and expansion of said slit sheet paper from said roll. According to some embodiments, a method of using the slit sheet paper cushioning product, includes manually wrapping the slit sheet paper in an expanded state around an item such as to create a plurality of layers of the expanded slit sheet paper surrounding the item for cushioning.

In some embodiments, the slit sheet paper is employed within a wall of an envelope for cushioning of the envelope. In some embodiments, the envelope includes a single layer of said slit sheet paper within the wall of the envelope for cushioning such as to reduce thickness of the wall. In some embodiments, the wall of said envelope includes an outer paper layer located on a first side of said slit sheet paper and an inner paper layer at a second side of said slit sheet paper. In some embodiments, the outer paper layer and/or said inner paper layer includes embossments.

In some embodiments, the slit sheet paper forms an alternating row expansion pattern when expanded to form said plurality of open cells. In some embodiments, the slit sheet paper is in an expanded state with said plurality of open cells forming an alternating row expansion pattern. In some embodiments, the alternating row expansion pattern includes alternating rows with bottom-side cell openings in bottom-side rows situated on a bottom side of the expanded slit sheet paper and with top-side cell openings in top-side rows situated on a top side of the expanded slit sheet paper.

In some embodiments, the number of supporting legs is at least 20% greater than the number of supporting legs of a slit sheet paper having 0.5 inch slits, whereby the slit pattern generates upon expansion more cells per square foot and provides a greater crush resistance and resiliency for cushioning than is provided by a slit sheet paper having 0.5 inch slits.

According to some embodiments, the slit sheet paper cushioning product is an envelope, including the at least one slit sheet paper in an expanded state; a first paper sheet facing a first face of said at least one slit sheet paper in said expanded state and fixed in relation to said at least one slit sheet paper along at least a portion of a periphery of said at least one expanded slit paper sheet; a second paper sheet facing an opposite face of said at least one slit sheet paper in said expanded state and fixed in relation to said at least one slit sheet paper along at least a portion of said periphery of said at least one slit sheet paper. In some embodiments, either: a) at least one of said first paper sheet and said second paper sheet are embossed sheets having a plurality of embossments that inhibit deformation of said first and second paper sheets due to contraction forces of said at least one slit sheet paper in said expanded state; or b) said first paper sheet and said second paper sheet are non-embossed sheets having a heavier weight compared to a weight of said at least one slit sheet paper in said expanded state thereby inhibiting deformation of said first and second paper sheets due to contraction forces of said at slit sheet paper in said expanded state.

According to some other embodiments of the present invention, a slit sheet paper cushioning product is provided that includes: at least one slit sheet paper having a slit pattern including a plurality of slits extending in a cross direction that forms a plurality of open cells upon expansion in a machine direction, said slit sheet paper being formed from an expandable paper that expands into an alternating row expansion pattern that includes alternating rows with bottom-side cell openings in bottom-side rows situated on a bottom side of the expanded slit sheet paper and with top-side cell openings in top-side rows situated on a top side of the expanded slit sheet paper. According to some embodiments, the slit sheet paper is made with an extensible paper. According to some embodiments, the extensible paper is extensible in a machine direction in a range of at least 5%. According to some embodiments, the extensible paper is extensible in a cross direction in a range of at least 5%. According to some embodiments, the extensible paper is extensible in a machine direction in a range of at least 5% and in a cross direction in a range of at least 5%. According to some embodiments, the extensible paper is extensible in a machine direction in a range of at least 6% and in a cross direction in a range of at least 6%. According to some embodiments, the extensible paper is extensible in a machine direction in a range of at least 7% and in a cross direction in a range of at least 7%. According to some, most preferred, embodiments, the extensible paper is extensible in a machine direction in a range of at least 8% and in a cross direction in a range of at least 8%. According to some embodiments, the extensible paper is extensible in a machine direction in a range of between 5% to 15% and in a cross direction in a range of between 5% to 15%. According to some embodiments, the extensible paper is extensible in a machine direction in a range of between 7% to 15% and in a cross direction in a range of between 7% to 15%. According to some embodiments, the plurality of slits each have a width of between 0.35 and 0.65 inches; according to some embodiments, the plurality of slits each have a width of between 0.45 and 0.55 inches. According to some embodiments, the plurality of slits each have a width of about 0.5 inches. According to some embodiments, the plurality of slits each have a width of less than 0.5 inches. According to some embodiments, the plurality of slits each have a width of less than 0.45 inches. According to some embodiments, the plurality of slits each have a width of less than 0.4 inches.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 6(A) to 6(C) show the formation of the alternating row expansion pattern according to the preferred embodiments of the invention, wherein FIG. 6(A) shows an illustrative slit pattern formed within a sheet of paper, FIG. 6(B) shows the slit pattern of FIG. 6(A) with regions of the paper prior to expansion highlighted for reference, and FIG. 6(C) is a photograph of an illustrative expanded slit sheet paper having a slit pattern similar to that shown in FIG. 6(B) in an expanded state;

FIGS. 7(A) and 7(B) are explanatory diagrams demonstrating increase cell concentration with reduction in slit lengths according to some preferred embodiments of the invention;

FIGS. 8(A) and 8(B) correspond to FIGS. 1 and 7, respectively, of U.S. patent application Ser. No. 16/531,017, wherein FIG. 8(A) shows a cross-sectional side view of an illustrative pad according to some preferred embodiments used for forming an envelope and FIG. 8(B) is a perspective view of an envelope formed with the envelope pad of FIG. 8(A) according to some illustrative embodiments;

In the attached drawings, FIGS. 4(A)-4(D), 5(A)-5(G) and 6(C) are photographs of actual products. Accordingly, these photographs show illustrative examples, to scale, such that these figures show illustrative examples to scale and angles and relative dimensions shown in these figures are as shown in these figures in such illustrative examples. Thus, e.g., angles of lands, legs, and other portions of the expanded slit sheet paper can be, in some embodiments, as shown in such figures. Moreover, in some alternative embodiments, such shown angles and relative dimensions can be varied slightly, such as, e.g., plus or minus 15% in some examples, or plus or minus 10% in some other examples.

DETAILED DESCRIPTION OF THE PREFERRED EMBODIMENTS

Figure 1:
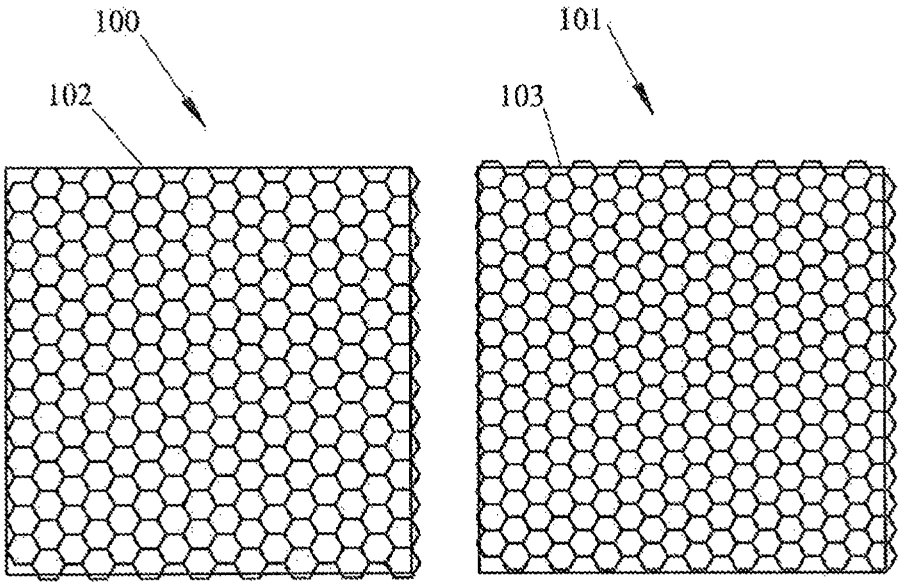
FIG. 1 is an explanatory planar view showing two slit patterns and the resulting number of cells per square foot.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

In the preferred embodiments, the present invention provides substantially improved slit sheet cushioning products by advantageously combining novel paper properties with novel slit patterns for improved features and characteristics. In some illustrative and non-limiting example embodiments, cushioning products of the present invention can include, e.g., a novel slit sheet material in combination with extensible paper employed as, e.g., a cushioning pad or as cushioning within an envelope product, wherein the cushioning product can be substantially more resilient, but, yet, e.g., thinner for better utilization of space.

In the preferred embodiments, an expanded paper cushioning product is provided that employs an improved slit arrangement that was unviable with prior expanded slit paper products, including a compacted slit pattern with, e.g., reduced slit lengths and reduced row spacings, along with the use of a novel extensible paper.

In accordance with some embodiments of the invention, a novel slit pattern is capable of being created that provides more cells per square foot and achieves a greater crush resistance and resiliency for cushioning. For example, the preferred embodiments have substantial advantage for wrapping of items packed within a container (e.g., use as a cushioning wrap) or as a pad for an envelope (including, in some illustrative preferred envelope embodiments, wherein the envelope includes at least an inner or outer layer of indented paper).

In some preferred embodiments, the slit paper pattern of slits advantageously has slits in the range from 0.30 to 0.45 inches (i.e., in the lengthwise dimension of the slits) and spaces between rows in the range from 0.1125 to 0.1688 inches (i.e., the distance between adjacent rows of slits). Most preferably, these embodiments are made from an extensible paper.

In some preferred embodiments, the slit paper has slits wherein the slit width is 0.45 inches plus 5%, minus 33% (i.e., here the slit width refers to the lengthwise dimension of the slits). Most preferably, again, these embodiments are also made from an extensible paper.

In some preferred embodiments, the slit pattern advantageously produces an expandable slit paper having a number of legs per square foot that is at least 20% greater than slit paper has slit (cut) widths of 0.5 inches.

In some preferred embodiments, an expanded slit paper cushioning product of the present invention has a number of legs per square foot that is at least 15% greater than slit paper that has slit (cut) widths of 0.5 inches. In some preferred embodiments, an expanded slit paper cushioning product of the present invention has such a number of legs per square foot that is in the range from 20% to 50% greater than that of slit paper having slit (cut) widths of 0.5 inches.

With the present invention, expanded slit sheets can be created having greatly improved cushioning characteristics. In some embodiments of the present invention, the improvement in cushioning characteristics can be achieved due to one or more, or all, of the following:

a) In the preferred embodiments, the use of an extensible paper enables an "easier opening" structure, which enables the creation of smaller cells, whereby the smaller cells advantageously lead to the formation of increased cell density and, hence, improved cushioning characteristics.
b) In some preferred embodiments, the use of an extensible paper enables the achievement of a novel "alternating row expansion pattern" which has substantially improved cushioning characteristics over prior expansion patterns (see discussion regarding novel alternating row expansion pattern below in this document).

Additionally, with the present invention, novel and previously-unviable cushioning products can be created, such as, for example:

a) In some preferred embodiments, a novel envelope structure can be achieved having great advantages over existing envelope structures. For example, the present invention enables a substantially thinner cushioning expanded slit sheet (e.g., with substantially smaller row spacings) and also provides substantial cushioning with a single layer or with just a few layers. Accordingly, an envelope with much narrower width can be achieved, and with even just a single cushioning layer. Furthermore, the envelope can be made with lighter weight paper, resulting in an easier to use product (e.g., less stiff) and a lighter product (e.g., reduced shipping costs). Notably, the lighter product weight along with the narrower product width both advantageously lead to reduced shipping costs.
b) In some preferred embodiments, a novel cushioning wrap can be achieved having great advantages over existing cushioning wraps, such as, e.g., increased cushioning characteristics, enabling, e.g., reduction in layers of cushioning required in some applications, reduction in amount of cushioning required, and other advantages and benefits as described herein.

Extensible Paper Employed in Preferred Embodiments

In some most preferred embodiments, extensible papers as set forth in the above-referenced U.S. Pat. No. 10,669,086 are employed. Towards that end, the following paragraphs (in quotations) under this section are quoted from the '086 patent set forth details of extensible papers according to some preferred embodiments that can be employed in preferred embodiments of the present invention.

"For the purposes of the present invention, the term "extensible" as applied to paper sheets, means a paper sheet that is able to stretch in a longitudinal direction of the paper sheet upon applying a force in the longitudinal direction of the paper sheet. Illustrative extensible sheets are disclosed in U.S. Pat. No. 3,908,071, U.S. patent application Ser. No. 14/901,977 (U.S. Pat. No. 9,945,077), International Application No. WO 1984002936, U.S. Publication Nos. 2002/0060034, 2007/0240841 (U.S. Pat. No. 7,918,966), and U.S. Pat. Nos. 3,104,197, 3,220,116, 3,266,972, 3,269,393, 3,908,071, 6,024,832, 6,458,447, and 6,712,930, the entire disclosures of which are incorporated by reference herein, as though recited in full. It should be understood that the stretching of an extensible paper must be measured in an unslit sheet of paper. As disclosed in U.S. Pat. No. 3,266,972, the test and characterization procedures employed in measuring elongation (extensibility) properties can be in accordance with standard TAPPI test Elongation T457. In addition, as disclosed in U.S. Pat. No. 3,266,972, the expression "extensible papers" means a paper having an increasable elongation in the machine direction as compared to standard, non-extensible Kraft paper."

"In some preferred embodiments, extensible paper can be produced by varying the accumulation of paper fibers by essentially slowing the paper feeding process during the drying method to trap extra fibers that make the paper appear to have microscopically sized rows of paper that you would see if one were to pleat the paper. The difference is that extensible paper's microscopic rows are adhered to each other through the use of binders and other types of adhesives in conjunction with the drying process. Reference is made to patent U.S. Application No. 2007/0240841 (U.S. Pat. No. 7,918,966) where the purpose is to create a non-creped extensible paper that does not easily disconnect from itself. In addition, the surface of the extensible paper is still fairly flat."

"In the preferred embodiments of the present invention, the extensible paper that is employed has low extensible properties as compared to other types of extensible papers. In this regard, an optimal extensible paper enables a smooth transition from an unexpanded to the expanded slit sheet by providing a small amount of stretching at the very start of expansion of the extensible slit sheet paper material."

"In some exemplary constructions, during expansion of a slit sheet, the force required to initiate expansion is substantially higher than the force required to continue expansion. For example, once the paper initially starts to bend at the slits, the expansion continues more easily during continued bending at the slits. The force required to continue the expansion of the slit sheet during this continued bending is dramatically reduced beyond the above-noted initial expansion. In some preferred embodiments, the extensible slit sheet paper substantially reduces the force required to initiate expansion. On the other hand, in some preferred embodiments, during the above-noted continued expansion, the extensible paper does not substantially stretch simultaneously with the process of expanding the slit sheet paper; otherwise, the expanded sheet might not optimally be made into a cushioning wrap."

"It should be noted that in this application, all theories related to functioning of the invention are provided to facilitate appreciation of concepts of the invention, rather than by way of limitation. Extensible paper, as designed, stretches as part of an increase in paper strength. In some embodiments, the functioning of the invention involves that the extensible slit sheet paper substantially utilizes the extensible property to ease the rotating the cells into the stretched shape and to resist tearing of the slit sheet during the expansion step. This means that at the initial point at which the cell rotates (i.e., initiating rotation between legs **38*a* and 38*b* on each side of the slit and land 20**) the extensible slit sheet paper is substantially enhanced by the extensible paper's ability to stretch. In some embodiments, the functioning of the invention, thus, involves that extensible papers' properties are substantially utilized at this initial point and substantially finished as soon as the cell begins to rotate into its three dimensional shape (i.e., after this initial point, the reliance on the extensible nature of the paper may be less substantial or even non-existent). After that initial point, the slit pattern properties, regardless of paper type, opens with greater ease to the point at which it forms a hexagon. Accordingly, in some embodiments, the extensible property substantially merely comes into play at the initial moment of expansion. In some other embodiments, while the extensible features of the paper comes into play most substantially at this initial point of rotation, the extensible features of the paper can have some affect during further expansion of the paper, whereby the initial point of expansion can be substantially facilitated due to extensibility and further expansion can also be, at least, somewhat facilitated due to extensibility."

"In some of the preferred embodiments, preferable extensible papers that can be employed include extensible papers where the purpose of the extensible nature is to provide the type of stretching found for the use of multi-wall bags for heavy weight items like cement, or seed and the like. U.S. Patent Publication No. 2016/0355985 (U.S. application Ser. No. 14/901,997) and U.S. Pat. Nos. 3,104,197 and 3,266,972 teach the manufacture and properties of this form of extensible paper. Further teachings can be found in "Understanding sheet extensibility", R. S. Seth, Pulp & Paper Canada T31, 106:2 (2005) III, pages 33-40 (T31-T38). The disclosures of the foregoing patents, patent publication, and printed publication are incorporated herein by reference, as though recited in full."

"The prior expanded slit sheet art (See, e.g., U.S. Pat. Nos. 5,538,778, 5,667,871, 5,688,578, and 5,782,735) focused on paper strength to inhibit tearing during the expansion process and Kraft paper was satisfactory because the strength required coincided with the thickness required to make a satisfactory wrapping product. The increased strength of an expandable sheet does not contribute to or increase the value/performance of the expansion of the slit sheet material. It has now been found by the present inventor that an expandable slit sheet paper can be substantially improved by the use of an extensible sheet. In the preferred embodiments, this use of an extensible slit sheet paper advantageously provides a reduction in force required to open the slit sheet and therefore provides a faster and easier expanding process for the user of the expanded slit sheet. The unexpected benefit resulting from the reduction in force at the very start of the expansion of the slit sheet provides an unexpected improvement to the slit sheet packaging product and renders the employment of the extensible paper highly unique. Notably, the prior expanded slit sheet paper persisted in and was widely used in the marketplace for decades without the contemplation of the present invention or the potential advantages therefrom."

"As set forth in this application, the present inventor has discovered that the force needed to expand an expandable slit sheet paper is far greater than the force required to expand an extensible slit sheet paper. By way of example, a 50 pound Kraft paper expandable slit sheet that is 15" wide prior to expansion requires approximately 4-6 pounds or 0.4 pounds per inch, whereas the force required to expand an extensible slit sheet of the same paper weight is 0.15-0.22 pounds per inch. This is a marked difference between the papers. Kraft paper has the strength to provide an acceptable expandable slit sheet. However, unexpectedly, the extensible slit sheet imparts an ease of expansion that greatly reduces the force required to expand the slit sheet, not based on the main purpose for extensible paper which is to increase its tensile strength but, rather, its capability to stretch. Since extensible paper is higher in cost and Kraft paper was strong enough, it was not previously known that extensible paper could be of benefit for making slit paper sheets of the types found in, e.g., U.S. Pat. Nos. 5,538,778, 5,667,871, 5,688,578, and 5,782,735, and U.S. Non-Provisional application Ser. No. 15/428,144. For example, it was not appreciated that an extensible slit sheet could have provided an equivalent strength to light weight, thin papers that previously had no applicability as a wrapping product. Light weight Kraft paper tears more easily than heavier weights of Kraft paper. It has now been found that the extensible paper enables the use of the lighter weight expanded slit-sheet papers that also advantageously provide gentler cushioning required by fragile items when a slit sheet is expanded, in contrast to the more rigid cushioning provided by heavier weight expanded slit-sheet papers."

"Reference is particularly made to the graph of Table 1 on page 5 of U.S. Patent Publication No. 2016/0355985 (now U.S. Pat. No. 9,945,077) as if recited in full, that describes paper strength based on certain manufacturing techniques. Within the graph is a column describing elongation at the point of paper break (or tearing of fibers) separated into two sub columns of the machine direction (MD) and cross direction (CD), also referred to as transverse direction. The elongation percentage of Table 1 ranges from 5.3% to 7.1% in the cross direction (CD) and 3.3% to 10.6% in the machine direction (MD)."

"Reference is also made to U.S. Pat. No. 3,266,972 within Table III of column 5 which references elongation in the percentage range from 3.7% to 4.6% in the CD or cross direction and 9.7% to 11.1% in the machine direction."

"In both '985 and '972, the variations are based on the manufacturing process that places an emphasis on tensile strength and stretch in either the cross direction or machine direction accordingly."

"The present inventor has discovered that for the purposes of expanding an extensible slit sheet paper for use as a packaging wrap and/or void fill, machine direction extensible ranges from 1%-9% provide an adequate extensibility, with 1% to 6% preferred, and 1% to 4% most highly preferred. The lower the extensibility coincides with lower costs of the paper per square foot. As indicated above, it should be understood that extensibility is measured on unslit paper."

"In some alternative embodiments, machine direction extensibility ranges of the extendible slit sheet paper can have ranges of:

a) from 1.5%-9%, or more preferably from 1.5% to 6% preferred, or even more preferably from 1.5% to 4%; or
b) from 2%-9%, or more preferably from 2% to 6% preferred, or even more preferably from 2% to 4%; or
c) from 3%-9%, or more preferably from 3% to 6% preferred, or even more preferably from 3% to 4%."

"For the purposes of expanding the slit sheet paper for use as a packaging wrap and/or void fill, it has been found that cross direction extensible ranges from 1%-5% provides an adequate extensibility with 1% to 4% preferred, and 1% to 3% most highly preferred."

"In some alternative embodiments, cross direction extensibility ranges of the extendible slit sheet paper can have ranges of: a) from 1.5%-5%, or more preferably from 1.5% to 4%, or even more preferably from 1.5% to 3%; or b) from 2%-5%, or more preferably from 2% to 4%, or even more preferably from 2% to 3%."

"In combination with the extensible paper, a smaller, lighter weight, and recyclable version of an expander can be employed (such as, e.g., made entirely or substantially entirely with recyclable cardboard in some illustrative embodiments). This expands the market to customers that use a very small amount of wrap as compared to the industrial market. It also provides for a less expensive expansion device to be employed for expanding the slit paper. Additionally, it enhances the ease of use by the packer by providing for less ripping during the wrapping process that occurs when the tension is not properly set. This occurs as the roll, during its continued use, becomes smaller and lighter in weight. As the roll of expanded slit sheet becomes lighter the tension required increases. Thus, there need for a varying tensioning method. With the use of the extensible paper, the tension required is significantly decreased and the strength of the paper is increased. Both benefit the person wrapping by making the tensioning required much less precise to the point at which, a single tension setting can be used with little or no adjustment. If the tension is set higher than necessary, the increase in strength from the extensible paper keeps the product from tearing and therefore makes it easier for the packer to use. Therefore, the packer can make fewer adjustments as the slit sheet roll becomes smaller and smaller."

"The reduction in the force required to expand the slit paper enables a new product to be created using lighter weight papers. In the past, expanded slit sheet paper is primarily used as a wrapping product whereas its use as a void fill would be in limited circumstances due to void fill being typically the cheapest, that is, the lowest cost of all packaging products. The increased strength of the extensible sheet enables the use of a thinner and lighter weight slit sheet paper as a void fill product. If the expanded slit sheet is not being used as a wrap, then the thicker 0.005", 50 pounds per 3,000 square feet paper and above is not required and a lighter weight 0.003-0.0045" thick, 30-40 pounds per 3,000 square feet paper can be used as void fill. It can also be used to provide cushioning that other paper void fill products have not been able to provide. It has now been found that even though the extensible paper has a 10% higher price, the use of a thinner paper provides much more square footage per ton and more than compensates for the increased cost of the extensible paper as compared to Kraft paper."

Detailed Descriptions of Technologies Employed in the Present Invention Quoted from Disclosures that are Incorporated by Reference "The Following are Citations from Clupak's paper patent (U.S. Pat. No. 9,945,077):"

"Example 1

Heavy-duty Clupak paper having a basis weight of 84.9 g/m$^2$ was made using a gap-former paper-making machine equipped with a Clupak system, at a paper-making speed of 480 m/min and using, as material, 100% unbleached softwood Kraft pulp that had been beaten at high concentration of 28%. The negative draw on the Clupak was set to −4.5%."

"Example 2

Heavy-duty Clupak paper was made in the same manner as in Example 1, except that the paper had a basis weight of 76.1 g/m$^2$ and the negative draw on the Clupak was set to −6.0%."

"Example 3

Heavy-duty Clupak paper was made in the same manner as in Example 1, except that the paper had a basis weight of 73.4 g/m$^2$ and the negative draw on the Clupak was set to −4.0%."

"Example 4

Heavy-duty Clupak paper was made in the same manner as in Example 1, except that the paper had a basis weight of 85.0 g/m$^2$, the negative draw on the Clupak was set to −4.0%, and the pulp blend consisted of 90% unbleached softwood Kraft pulp and 10% unbleached hardwood Kraft pulp."

"Comparative Example 1

Heavy-duty Clupak paper was made in the same manner as in Example 1, except that the paper had a basis weight of 71.9 g/m$^2$ and the negative draw on the Clupak was set to −10.0%."

"Comparative Example 2

Heavy-duty Clupak paper was made in the same manner as in Example 1, except that the paper had a basis weight of 85.4 g/m$^2$ and the negative draw on the Clupak was set to −1.0%."

"Comparative Example 3

Heavy-duty Kraft paper was made in the same manner as in Example 1, except that the paper had a basis weight of 76.0 g/m$^2$ and the Clupak process was not performed."

TABLE 1

| | | Clupak negative draw % | Basis weight g/m$^2$ | Paper thickness µm | Density g/cm$^3$ | Air resistance sec | Tensile index Nm/g | | Elongation at break % | | TEA index J/g | | Tensile stiffness index kNm/g | | Tear index mN · m$^2$/g | | Formation | Breaking after processsed into heavy-duty sack |
|---|---|---|---|---|---|---|---|---|---|---|---|---|---|---|---|---|---|---|
| | | | | | | | MD | CD | MD | CD | MD | CD | MD | CD | MD | CD | | |
| Examples | 1 | −4.5 | 84.9 | 121 | 0.70 | 14 | 88.1 | 31.3 | 7.0 | 7.1 | 3.55 | 1.55 | 5.62 | 3.64 | 12.8 | 28.9 | ○ | ○ |
| | 2 | −6.0 | 76.1 | 118 | 0.65 | 12 | 69.5 | 33.0 | 8.1 | 5.8 | 3.22 | 1.47 | 4.18 | 3.07 | 19.7 | 25.8 | ○ | ○ |
| | 3 | −4.0 | 73.4 | 110 | 0.67 | 13 | 72.5 | 30.1 | 6.0 | 6.0 | 2.60 | 1.17 | 4.95 | 3.43 | 14.9 | 20.3 | ○ | ○ |
| | 4 | −4.0 | 85.0 | 129 | 0.66 | 13 | 83.3 | 39.4 | 7.4 | 6.3 | 3.47 | 1.51 | 5.33 | 3.44 | 13.1 | 25.5 | ◎ | ○ |
| Comparative Examples | 1 | −10.0 | 71.9 | 112 | 0.64 | 12 | 52.0 | 28.0 | 10.6 | 5.3 | 3.47 | 1.02 | 3.09 | 3.14 | 19.7 | 27.1 | ○ | X |
| | 2 | −1.0 | 85.4 | 130 | 0.66 | 15 | 85.0 | 32.1 | 3.7 | 6.7 | 1.99 | 1.49 | 7.12 | 3.70 | 16.3 | 20.4 | ○ | X |
| | 3 | Not used | 76.0 | 119 | 0.64 | 18 | 92.1 | 35.5 | 3.3 | 5.4 | 1.89 | 1.49 | 8.92 | 3.85 | 19.1 | 24.9 | ○ | ○ |

"Evaluation Methods:

(Measurement of Tensile Energy Absorption Index)

Measured by the method specified in JIS P8113: 2006.

(Measurement of Breaking Elongation)

Measured by the method specified in JIS P8113: 2006.

(Measurement of Tear Index)

Measured by the method specified in JIS P8116: 2000.

(Measurement of Burst Index)

Measured by the method specified in JIS P8112: 2008.

(Measurement of Tensile Stiffness Index)

Measured by the method specified in ISO/DIS 1924-3.

(Measurement of Freeness after Disintegration)

Measured by the method specified in JIS P8220: 1998 and JIS P8121: 1995."

"Looking at the properties of the Clupak papers in Examples 1 to 4 and Comparative Examples 1 and 2 as well as those of the Kraft paper in Comparative Example 3, as shown in Table 1, the Clupak papers described in Examples 1 to 4 exhibit a good balance of various strengths and elongation and have excellent strength overall; on the other hand, the Clupak papers described in Comparative Examples 1 and 2 and Kraft paper described in Comparative Example 3 exhibit a poor balance of various strengths and elongation and cannot be said to have excellent strength overall."

"The Following are Citations from "Understanding Sheet Extensibility", R. S. Seth, (Pulp and Paper Research Institute of Canada 3800 Wesbrook Mall Vancouver, BC, Canada V6S 2L9) Pulp & Paper Canada T31, 106:2 (2005) III, Pages 33-40 (T31-T38):

Tensile strength and extensibility or stretch are two important failure properties of paper. They are defined by the end-point of the sheet's load-elongation curve (FIG. 1). Individually and together, they are important for many product performance properties. For example, TEA, the tensile energy absorbed by the sheet before failure is proportional to the area under the load-elongation curve. Thus, it depends on both the tensile strength and extensibility of the sheet. A high TEA is desired in sack papers [1]. The bursting strength of paper has been shown to be proportional to the product of tensile strength and the square-root of stretch [2]. The fracture toughness of paper has been found to depend strongly on the sheet's tensile strength and stretch [3, 4]. Sheet stretch has also been regarded as important for paper runnability both at the paper machine's dry-end and in the pressroom [5-8]. Papers with high stretch also seem to have a somewhat higher tearing resistance [9], and folding endurance; they are found to be more dimensionally unstable as well [10]. The factors that control sheet tensile strength are fairly well understood [4]. The tensile strength is high if fibres are strong, long, fine and thin-walled. The fibres should be conformable and have a high fibre-fibre bond strength. The sheet tensile strength is also high if fibres are straight, free from deformations and the sheets are well formed. Otherwise, the stress is unevenly distributed when the sheet is strained, leading to premature failure."

"This report deals with the factors that control sheet stretch." "Factors that Control Sheet Stretch:

A specimen under tensile load extends more, the longer it is. Therefore, extensibility or stretch or strain at failure as a material property, is expressed as a percentage of the original specimen length (FIG. 1)."

Figure 2:
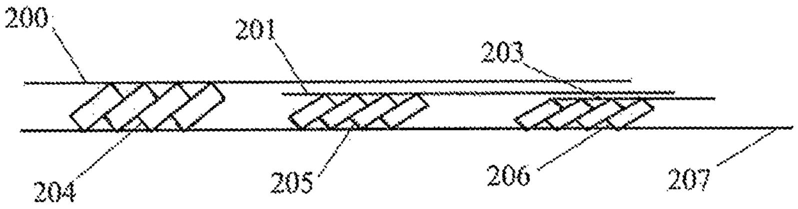
FIG. 2 is an explanatory side view of the cell structure of the expanded slit sheet material depicting some embodiments of the present invention in comparison to background art.

"Role of bonding:

Regardless of how bonding between the fibres is increased—by wet pressing, beating or refining, or additives, the sheet stretch of a furnish generally increases with increased fibre-fibre bonding. This is observed for almost all papermaking fibres—chemical, mechanical, wood, non-wood, or recycled. The reasons are as follows. Fibres have a certain "stretch-potential". However, this potential is realized in paper only when fibres form a bonded network. If the bonding is weak, the network fails before the stretch-potential is realized; the sheet stretch is low. As bonding in the network is increased, the stretch-potential of fibres is increasingly realized, the sheet stretch increases. Since increased inter-fibre bonding also increases sheet tensile strength, an increase in stretch with tensile strength is often observed for handsheets (FIG. 2). The stronger the sheet, the more the fibres' stretch-potential is utilized. Because of this relationship between tensile strength and stretch, factors such as sheet grammage or formation that tend to affect tensile strength also affect sheet stretch [11]. A comparison of handsheet stretch values at similar tensile strengths provides a meaningful comparison of the stretch-potential of various furnishes."

"The Following are Citations from Trani et al.'s Extensible Paper Patent (U.S. Pat. No. 7,918,966):"

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper web not yet formed and presenting a moisture content of about 35%/45% between two rollers rotating at different speeds. One of these rollers, generally the lower roller, is made of rubber and is rotated at lower speed, while the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper to prepare it for transverse extensibility. By an amount which can reach 10-15%. On the other band the spiral groove contributes to maintaining longitudinal advancement of the processed paper web along the machine."

"The Following are Citations from Cabell et al.'s Extensible Paper Web Patent (U.S. Pat. No. 6,458,447):"

"Tensile and Percent Stretch Test:

The tensile test is used for measuring force versus percent elongation properties. The tests are performed on a Thwing Albert Intellect II-STD Model No. 1451-24PGB, available from the Thwing-Albert Co. of Philadelphia, Pa."

"The samples used for this test are 1" wide×6" long with the long axis of the sample cut parallel to the direction of maximum extensibility of the sample. The sample should be cut With a sharp Exacto knife or some suitably sharp cutting device design to cut a precise 1" wide sample. (If there is more than one direction of extensibility of the material, samples should be taken parallel to representative direction of elongation). The sample should be cut so that an area representative of the symmetry of the overall pattern of the deformed region is represented. There will be cases (due to variations in either the size of the deformed portion or the relative geometries of regions 1 and 2) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested."

"The Following are Citations from Cramer et al.'s Extensible Paper Patent (U.S. Pat. No. 3,266,972):"

"Test and Characterization Procedures:

The test and characterization procedures employed in measuring various properties reported herein are listed in Table I below. Unless otherwise indicated the code letter numerals indicate standard TAPPI tests."

"Elongation T457:

By the expression "extensible papers" is meant a paper having an increased elongation (generally a minimum of about 6%) in the machine direction.

In runs IA and IB of this example, rosin size (0.3% by weight based on the weight of pl up) is added at the beater and the pH is adjusted to 4.5 with alum. The stock, having a consistency of 3.6% is dropped to the beater chest and is then pumped to a second chest, passed through a Jordan and continuously diluted with "white water" at the Fourdrinier headbox to a consistency of 0.3%. Properties measured on the various papers is reported in Table III. Each paper has a basis weight of from 49.4 to 50.3 pounds per ream."

TABLE III

| Property | | IA | 1B | IC | ID |
|---|---|---|---|---|---|
| Tensile (lbs/in.) | MD | 15.6 | 16.0 | 18.2 | 22.4 |
| | CD | 12.6 | 13.0 | 14.3 | 15.4 |
| Elongation (percent) | MD | 10.1 | 11.2 | 9.9 | 9.7 |
| | CD | 3.7 | 4.3 | 4.4 | 4.6 |
| Work-to-break | MD | 1.01 | 1.05 | 1.14 | 1.34 |
| (in.-lbs./in.2) | CD | 0.34 | 0.4I | 0.47 | 0.50 |
| MIT Fold | MD | 380 | 398 | 496 | 1,021 |
| | CD | 106 | 94 | 132 | 167 |
| CSI Abrasion (cycles) | MD | 14 | | 20 | 25 |
| | CD | 7 | | 37 | 64 |

"The Following are Citations from Trani et al.'s Multilayer Paper Material Patent (U.S. Pat. No. 8,518,522):"

"These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof."

"As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%."

"The Following are Citations from Trani et al.'s Extensible Paper Material Application (U.S. Application No. 2007/0240841):"

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper Web, not yet formed and presenting a moisture content of about 35%/45%, between two rollers rotating at different speeds. One of these rollers, generally the lower roller, is made of rubber and is rotated at lower speed, While the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper, to prepare it for transverse extensibility, by an amount which can reach 10-15%. On the other hand the spiral groove contributes to maintaining longitudinal advancement of the processed paper web along the machine."

Further details related to extensible papers that can be employed in some preferred embodiments are also quoted in the '086 patent as follows.

"The following is a direct quote of the paragraph on column 1, lines 4-19, of U.S. Pat. No. 3,908,071 incorporated by reference in the preceding paragraph: "Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks." In addition, the following is a direct quote of the Abstract of U.S. Pat. No. 6,024,832 incorporated by reference in the preceding paragraph: "A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30.degree. SR, the compacting stage is carried out between at least a pair of rollers of which one is of hard material comprising circumferential surface ribs and driven at greater speed, and the other is of soft material with a smooth surface and driven at lesser speed." In addition, the following is a direct quote of the 2nd paragraph of the Background section of U.S. Pat. No. 9,945,077 incorporated by reference in the preceding paragraph: "On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above." In addition, the following is a direct quote of the paragraph on column 2, lines 41-56 of U.S. Pat. No. 3,104, 197 incorporated by reference in the preceding paragraph: "The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability and extensibility."

"The following are direct quotes of paragraphs [0003] and [0028] of U.S. Patent Publication No. 2016/0355985 incorporated by reference in the preceding paragraph: (1) [0003] On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above;" and [0028] The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

In some embodiments, extensible paper employed can involve one or more of the following features, as set forth in the '086 patent.

Example 1: An extensible slit sheet paper cushioning product, comprising: a roll of slit sheet paper having a slit pattern including a plurality of slits extending in a cross direction that forms a plurality of open cells upon expansion in a machine direction, said roll resisting pulling of a length of slit sheet paper along the machine direction to enable expansion of the length of slit sheet paper in the machine direction, said slit sheet paper being formed from a paper that is extensible in the machine direction and the cross direction prior to providing said slit pattern, said extensible paper having an extensible range of 3 to 20% in the machine direction prior to providing said slit pattern.

Example 2: The extensible slit sheet paper cushioning product of example 1, wherein said extensible range is not less than 5% in both the machine direction and cross direction.

Example 3: The extensible slit sheet paper cushioning product of example 1, wherein said extensible range is 3-15% in the machine direction.

Example 4: The extensible slit sheet paper cushioning product of example 1, wherein said slit sheet paper is configured such that expansion is performed by applying an expansion force of 0.15 to 0.22 pounds per inch to form said open cells.

Example 5: The extensible slit sheet paper cushioning product of example 2, wherein said slit sheet paper is configured such that expansion is performed by applying an expansion force of 0.15 to 0.22 pounds per inch to form said open cells.

Example 6: The extensible slit sheet paper cushioning product of example 5, wherein said slit sheet paper has a weight, prior to expansion, from about 30 to 50 pounds per 3,000 sq. ft.

Example 7: The extensible slit sheet paper cushioning product of example 1, wherein said slit sheet paper has a weight, prior to expansion, from about 30 to 50 pounds per 3,000 sq. ft.

Example 8: A shipping package comprising: a wrapped object, said wrapped object being wrapped in at least two layers of an expanded slit sheet paper wrap having interlocking hexagonal cells, said slit sheet paper having a slit pattern including a plurality of slits extending in a cross direction that forms a plurality of hexagonal cells upon expansion in a machine direction and being expanded by applying an expansion force and wrapped to form said at least two layers of expanded slit sheet paper wrap having interlocking hexagonal cells, said slit sheet paper being formed from a paper that is extensible in the machine direction and the cross direction prior to providing said slit pattern, said extensible paper having an extensible range of 3 to 20% in the machine direction prior to providing said slit pattern.

Example 9: The shipping package of example 8, wherein said extensible range is not less than 5% in both the machine direction and cross direction.

Example 10: The shipping package of claim 8, wherein said extensible range is 3-15% in the machine direction.

Example 11: The shipping package of example 8, wherein said slit sheet paper is configured such that expansion is performed by applying an expansion force of 0.15 to 0.22 pounds per inch to form said hexagonal cells.

Example 12: The shipping package of example 11, wherein said slit sheet paper has a weight, prior to expansion, from about 30 to 50 pounds per 3,000 sq. ft.

Example 13: The shipping package of example 8, wherein said slit sheet paper has a weight, prior to expansion, from about 30 to 50 pounds per 3,000 sq. ft.

Example 14: A method of expanding and wrapping a slit sheet paper that upon expansion and wrapping forms two or more layers of interlocking hexagonal cells, comprising the steps of: providing said slit sheet paper having a slit pattern including a plurality of slits extending in a cross direction that forms a plurality of hexagonal cells upon expansion in a machine direction, wherein said slit sheet paper being formed from a paper that is extensible in the machine direction and the cross direction prior to providing said slit pattern, said extensible paper having an extensible range of 3 to 20% in the machine direction prior to providing said slit pattern, expanding said slit sheet paper, and wrapping said expanded slit sheet paper to form adjacent layers, said adjacent layers being in interlocking contact, whereby expanded layers resist contraction and tearing.

Example 15: The method of example 14, wherein said extensible range is not less than 5% in both the machine direction and cross direction.

Example 16: The method of example 14, wherein said extensible range is 3-15% in the machine direction.

Example 17: The method of example 14, wherein said step of expanding comprises applying an expansion force of 0.15 to 0.22 pounds per inch to form said hexagonal cells.

Example 18: The method of example 17, wherein said slit sheet paper has a weight, prior to expansion, from about 30 to 50 pounds per 3,000 sq. ft.

Example 19: The method of example 14, wherein said slit sheet paper has a weight, prior to expansion, from about 30 to 50 pounds per 3,000 sq. ft.

Example 20: The method of example 14, wherein the step of wrapping said slit sheet paper to form said adjacent layers, comprises: wrapping the expanded slit sheet paper around an object and forming said two or more layers of overlying interlocking hexagonal cells around said object, said overlying interlocking hexagonal cells being in direct contact substantially across the width of the layers.

Example 21: The method of example 20, wherein said extensible range is 3-15% in the machine direction and not less than 5% in the cross direction.

Example 22: The method of example 20, wherein said extensible range is 3-9% in the machine direction and not less than 5% in the cross direction.

Example 23: The method of example 20, wherein said step of expanding comprises applying an expansion force of 0.15 to 0.22 pounds per inch to form said hexagonal cells.

Example 24: The method of example 21, wherein said step of expanding comprises applying an expansion force of 0.15 to 0.22 pounds per inch to form said hexagonal cells.

Example 25: A method of protecting an object for shipping by wrapping and cushioning said object in an expanded slit sheet material, comprising the steps of: a) providing a roll with a sheet of expandable sheet material wound therearound, said sheet of expandable sheet material being flexible, non-woven fibrous material, and having a plurality of spaced parallel rows of individual slits extending in a cross direction, said flexible, non-woven fibrous material being a paper that is extensible in the machine direction and the cross direction prior to providing said slits, said extensible paper having an extensible range of 3 to 20% in the machine direction prior to providing said slits; b) expanding a length of said expandable sheet material unrolled from said roll by applying an expansion force to form at least one expanded slit sheet material having an array of openings; c) wrapping said at least one expanded slit sheet material around an object; and d) placing the wrapped object in a package.

Example 26: The method of example 25, wherein said extensible range is 3-15% in the machine direction and not less than 5% in the cross direction.

Example 27: The method of example 25, wherein said extensible range is 3-9% in the machine direction and not less than 5% in the cross direction.

Example 28: The method of example 25, wherein said step of expanding a length of said expandable sheet material comprises applying an expansion force of 0.15 to 0.22 pounds per inch.

Example 29: The method of example 26, wherein said step of expanding a length of said expandable sheet material comprises applying an expansion force of 0.15 to 0.22 pounds per inch.

Example 30: The method of example 25, wherein the slit extensible paper has a weight, prior to expansion, from about 30 to 50 pounds per 3,000 sq. ft.

Example 31: The method of example 28, wherein the slit extensible paper has a weight, prior to expansion, from about 30 to 50 pounds per 3,000 sq. ft.

Example 32: The extensible slit sheet paper cushioning product of example 1, wherein said extensible range is 3-11.1% in the machine direction.

Example 33: The shipping package of example 8, wherein said extensible range is 3-11.1% in the machine direction.

Example 34: The method of example 14, wherein said extensible range is 3-11.1% in the machine direction.

Example: 35: The method of example 25, wherein said extensible range is 3-11.1% in the machine direction.

Example 36: The extensible slit sheet paper cushioning product of example 1, wherein said extensible range is 3.3-10.6% in the machine direction.

Example 37: The shipping package of example 8, wherein said extensible range is 3.3-10.6% in the machine direction.

Example 38: The method of example 14, wherein said extensible range is 3.3-10.6% in the machine direction.

Example 39: The method of example 25, wherein said extensible range is 3.3-10.6% in the machine direction.

Example 40: The extensible slit sheet paper cushioning product of example 1, wherein said extensible range is 9.7-11.1% in the machine direction.

Example 41: The shipping package of example 8, wherein said extensible range is 9.7-11.1% in the machine direction.

Example 42: The method of example 14, wherein said extensible range is 9.7-11.1% in the machine direction.

Example 43: The method of example 25, wherein said extensible range is 9.7-11.1% in the machine direction.

Example 44: The extensible slit sheet paper cushioning product of example 1, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 45: The shipping package of example 8, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 46: The method of example 14, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 47: The method of example 25, wherein said extensible paper is formed by imparting a treatment prior to providing the slits comprising inserting said paper between a roll and an endless pre-stretched blanket to compress the paper with a nip bar and the blanket (or otherwise compressing the paper between two different (e.g., differently moving) surfaces, such as between two different rollers).

Example 48: The method of example 14, wherein said step of expanding includes a user manually expanding said slit sheet material.

Example 49: The method of example 48, wherein said user manually expanding said slit sheet material includes the user manually grasping said slit sheet material and drawing and unrolling the slit sheet material from a roll against resistance from the roll.

Example 50: The method of example 25, wherein said user manually expanding a length of said expandable sheet material unrolled from the roll includes the user manually grasping the expandable sheet material and drawing and unrolling the expandable sheet material from the roll against resistance from the roll.

Example 51: The extensible slit sheet paper cushioning product of example 1, wherein said extensible paper is a nonwoven fibrous material with fibre-to-fibre bonding that resists tearing upon 3-15% expansion in the machine direction as measured prior to providing the slit pattern.

Example 52: The shipping package of example 8, wherein said extensible paper is a nonwoven fibrous material with fibre-to-fibre bonding that resists tearing upon 3-15% expansion in the machine direction as measured prior to providing the slit pattern.

Example 53: The method of example 14, wherein said extensible paper is a nonwoven fibrous material with fibre-to-fibre bonding that resists tearing upon 3-15% expansion in the machine direction as measured prior to providing the slit pattern.

Example 54: The method of example 25, wherein said nonwoven fibrous material comprises fibre-to-fibre bonding that resists tearing upon 3-15% expansion in the machine direction as measured prior to providing the slits.

Example 55: The extensible slit sheet paper cushioning product of example 1, wherein said roll of slit sheet paper is wound on a cylindrical core, and said length of slit sheet paper extends from said roll of slit sheet paper.

Example 56: The extensible slit sheet paper cushioning product of example 1, wherein said extensible range is 5-15% in a cross-direction.

Example 57: The extensible slit sheet paper cushioning product of example 1, wherein said extensible range is 7.1-15% in a cross-direction.

Example 58: An extensible slit sheet paper cushioning product, comprising: a length of slit sheet paper having a slit pattern including a plurality of slits extending in a cross direction that forms a plurality of open cells upon expansion in a machine direction, said slit sheet paper being formed from a paper that is extensible in the machine direction and the cross direction prior to providing the slit pattern, said extensible paper having an extensible range of 3 to 20% in the machine direction prior to providing the slit pattern.

Example 59: The extensible slit sheet paper cushioning product of example 58, further including a resister that resists pulling of the length of slit sheet paper along the machine direction to enable expansion of the length of slit sheet paper in the machine direction.

Example 60: The extensible slit sheet paper cushioning product of example 59, wherein said resister is a roll of slit sheet paper from which said length of slit sheet paper extends.

Example 61: The extensible slit sheet paper cushioning product of example 58, wherein said extensible range is not less than 5% in both the machine direction and cross direction.

Example 62: The extensible slit sheet paper cushioning product of example 58, wherein said extensible range is 3-15% in the machine direction.

Example 63: The extensible slit sheet paper cushioning product of example 58, wherein said slit sheet paper is configured such that expansion is performed by applying an expansion force of 0.15 to 0.22 pounds per inch to form said open cells.

Example 64: The extensible slit sheet paper cushioning product of example 58, wherein said slit sheet paper has a weight, prior to expansion, from about 30 to 50 pounds per 3,000 sq. ft.

Example 65: The extensible slit sheet paper cushioning product of example 58, wherein said extensible sleet sheet paper cushioning product is a shipping package.

Example 66: The extensible slit sheet paper cushioning product of example 65, wherein said slit sheet paper is arranged to protect an object placed inside said shipping package.

Example 67: The extensible slit sheet paper cushioning product of example 66, wherein said slit sheet paper is arranged to extend around the object placed inside said shipping package.

Example 68: A method of using the extensible slit sheet paper cushioning product of example 66, comprising shipping the shipping package with an object protected by said extensible paper inside said shipping package.

Example 69: The extensible slit sheet paper cushioning product of example 1, wherein said a slit pattern is configured to form a plurality of hexagonal cells upon expansion in a machine direction.

Example 70: The extensible slit sheet paper cushioning product of example 69, wherein said hexagonal cells are three-dimensional hexagonal cells with substantially rectangular land portions situated at an inclined angle transverse to an original plane of the slit sheet paper, and leg portions connecting the land portions.

Example 71: The extensible slit sheet paper cushioning product of example 58, wherein said a slit pattern is configured to form a plurality of hexagonal cells upon expansion in a machine direction.

Example 72: The extensible slit sheet paper cushioning product of example 71, wherein said hexagonal cells are three-dimensional hexagonal cells with substantially rectangular land portions situated at an inclined angle transverse to an original plane of the slit sheet paper, and leg portions connecting the land portions.

Envelope Products in Some Preferred Embodiments

According to some preferred embodiments of the invention, novel extensible sleet sheet paper cushioning product according preferred embodiments of the present invention can be employed in the manufacture of envelopes. In some preferred embodiments, the envelopes can be of the type disclosed in applicant's pending U.S. application Ser. No. 16/531,017 (the '017 application), filed May 6, 2020, and also filed as PCT/US2019/045027 (published Feb. 13, 2020 as WO2020/033275), the entire disclosures of which are incorporated by reference, as though recited in full herein.

By way of illustration, FIGS. 8(A) and 8(B) correspond to FIGS. 1 and 7, respectively, from the '017 application. As shown in this exemplary embodiment, the example employs expanded slit sheet material in combination with an exterior layer of embossed paper to produce a padded envelope with cushioning properties. Although an embossed outer paper is shown, in some embodiments, embossing can be eliminated.

As shown in FIG. 8(A), this illustrative embodiment has a four-layer composite pad 100 is formed having a first layer of embossed paper 104, two layers of expanded slit paper sheets 102, 103, and a fourth top-layer of embossed paper 101. In formation of the envelope, this composite is folded over and sealed along the edges to form an envelope pouch. In the preferred embodiments, this produces a paper pad that is completely recyclable and made mostly of recycled paper. In order to form the envelope 600 from the pad shown in FIG. 8(A), first, the pad is folded over such as to create a pouch area 704 as shown in FIG. 8(B), and the sides 703 are crushing and glued. Then, a double-sided adhesive strip 502 is attached to a lip portion as shown in FIG. 8(B), along with a release liner 701 which is removed to expose the adhesive and fold over the lip portion 702 that extends past the pouch 704 adhere the lip portion 702 to the front of the pouch to close and seal the envelope.

In some preferred embodiments, the slit paper pattern of slits advantageously has slits in the range from 0.2 to 0.3 inches (i.e., in the lengthwise dimension of the slits) and spaces between rows in the range from 0.06 to 0.7 inches (i.e., the distance between adjacent rows of slits). Preferably, the slit paper pattern of slits advantageously has slits of about 0.25 inches (i.e., in the lengthwise dimension of the slits) and spaces between rows of about 0.06 to about 0.065 inches (i.e., the distance between adjacent rows of slits) and most preferably spaces between rows of about 0.0625 inches.

Preferably the space between the slits of each row is in the range from about 0.1 to about 0.09 inches and most preferably, the space between the slits of each row is about 0.094 inches.

Figure 9:
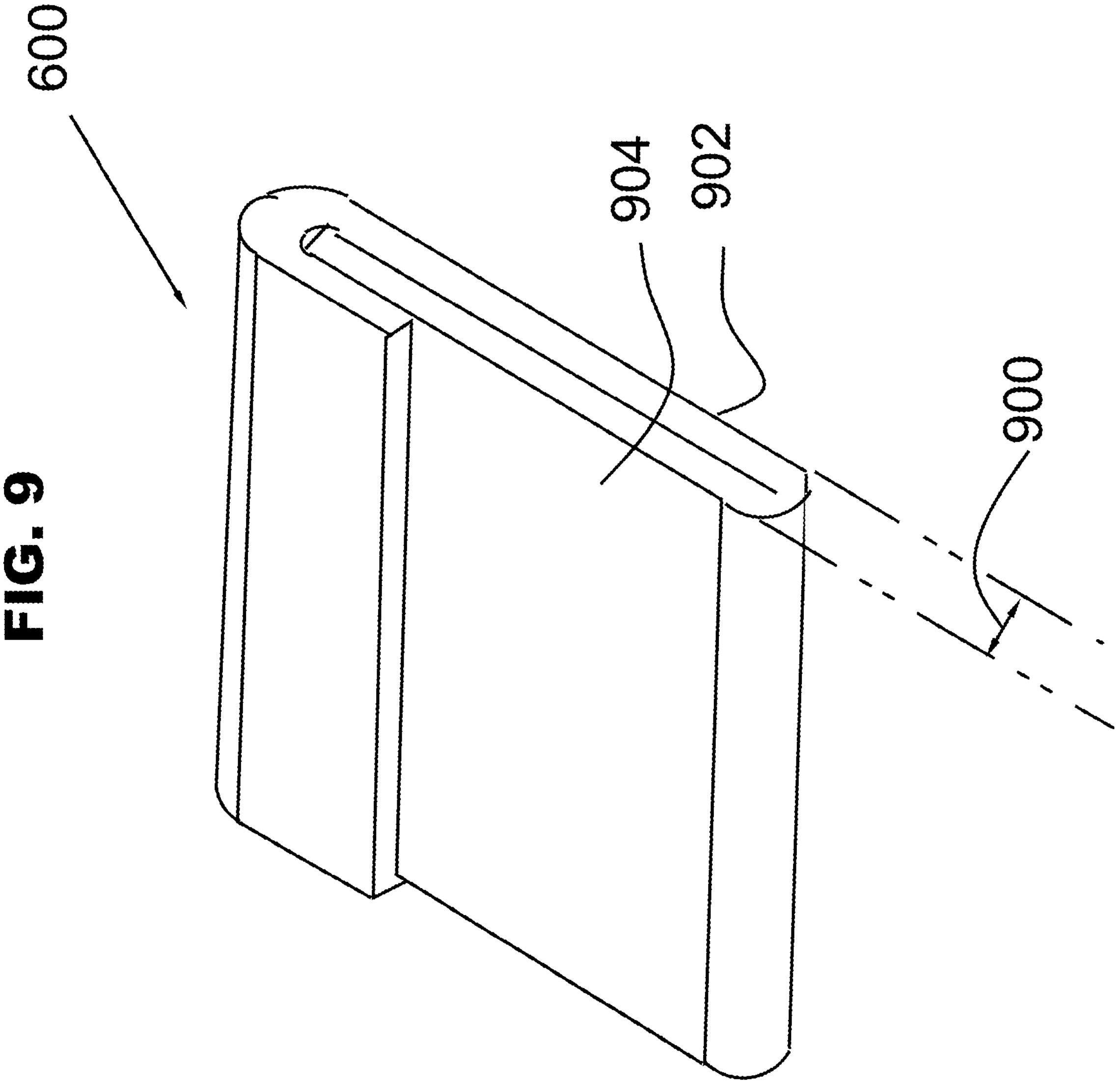
FIG. 9 is an illustrative example that corresponds to FIG. 8(B) and shows an envelope 600 in an sealed configuration, and in which the distance between the outer surfaces 904 and 902 is indicated by double arrow 900.

The foregoing dimensions produce a slit pattern that creates more cells per square foot, provides crush resistance and resiliency for cushioning the items packed within an envelope while providing a thin envelope. In some example, a "thin envelope" is provided that has a distance between the outermost layers 904 and 902 of the envelope (see, e.g., FIG. 9) that employs a slit paper pattern of slits in the range from 0.2 to 0.3 inches (i.e., in the lengthwise dimension of the slits) and spaces between rows in the range from 0.06 to 0.7 inches (i.e., the distance between adjacent rows of slits).

Although this example includes two internal expanded slit paper sheets 102, 103, in some preferred embodiments, which employ the novel slit sheet paper of the present invention, a single layer of expanded slit sheet paper can be employed. For example, the layers 104 and 101 can, in some embodiments of the present invention, be located on opposite sides of a single layer of expanded slit sheet paper. Moreover, as indicated above, although FIG. 8(A) shows layer 101 with embossments, in some embodiments, the layer 101 can be free of embossments. Similarly, as indicated above, although FIG. 8(A) shows layer 104 with embossments, in some embodiments, the layer 104 can be free of embossments. Moreover, in some embodiments, both layers 101 and 104 can be free of embossments.

Embossed Paper Employed in Some Preferred Embodiments

According to some preferred embodiments of the invention, novel extensible sleet sheet paper cushioning product according preferred embodiments of the present invention can be employed in the manufacture of products (such as, for example, envelopes or various other products) include embossed paper. In some preferred embodiments, products employing such embossed paper can be of the type disclosed in applicant's pending U.S. application Ser. No. 16/870,195, filed May 8, 2020, and also filed as PCT/US2020/32146, as well as in the above-noted '017 application, the entire disclosures of which are incorporated by reference, as though recited in full herein.

In the preferred embodiments, the term "embossed" means to raise and/or to lower a region of a sheet of paper. Most preferably, embossments involve raised and/or lowered regions of a sheet of paper which are raised and/or lowered by the application of a force such as to press the paper to assume an embossed shape in which the pressure causes deformation in the sheet of paper such as to have a shape including such raised and/or lowered regions. In some preferred embodiments, the sheet of paper is initially substantially planar and without the raised and/or lowered regions of the embossments in an initial state, and, then, the sheet of paper is pressed to cause deformation in the sheet of paper including raised and/or lowered regions. These raised and/or lowered regions from the original plane of the original planar sheet of paper are referred to, in the most preferred embodiments, as "embossed" regions or "embossments." By way of example, in the most preferred embodiments, embossments are created by pressing an initial sheet (e.g., a planar or substantially planar sheet) between opposing pressing surfaces, such as, e.g., (1) between die plates that are reciprocated relative to one another to press the surface of the planar sheet, wherein the die plates have a pattern of raised and lowered regions (e.g., male and female regions) that create a cross pressure on the face of the planar sheet to cause the sheet to deform and form embossments and/or (2) between two rollers wherein the rollers have a pattern of raised and lowered regions (e.g., male and female regions) that create a cross pressure on the face of the planar sheet to cause the sheet to deform and form embossments. In some embodiments, embossments can involve pressure applied by a single reciprocated die plate that has a raised/lowered embossment pattern that presses against a first surface of the paper, while an opposite side of the paper is pressed or supported by a resilient (e.g., rubber) member that flexibly receives the raised and/or lowered portions to cooperative cause embossments in the paper sheet. Similarly, in some embodiments, embossments can involve pressure applied by a single roll die that has a raised/lowered embossment pattern that presses against a first surface of the paper, while an opposite side of the paper is pressed or supported by a resilient (e.g., rubber) roll member, or other surface member, such as a conveyor or other member, that flexibly receives the raised and/or lowered portions to cooperative cause embossments in the paper sheet In some preferred embodiments, embossments are formed in a repeating pattern along a conveyed sheet of paper that is conveyed from an initial roll. In some preferred embodiments, the embossments define discrete shapes that are displaced from the original plane of the paper (e.g., raised and/or lowered) within separated regions along the face of the sheet of paper. In some preferred embodiments, these discrete regions can have an irregular shape, while in some embodiments these discrete regions can have a circular shape, elliptical shape, oval shape, polygonal shape, triangular shape, square shape, pentagonal shape, hexagonal shape, octagonal shape and/or other shapes. In the most preferred embodiments, the embossments have a hexagonal shape. Here, the terminology "shape" of the embossments in the above paragraph refers to the shape of the embossments as viewed downwardly towards a face of the paper sheet. It should be understood that, as seen in a side view, such embossments have a different shape.

Novel Expansion Pattern

Figure 3A:
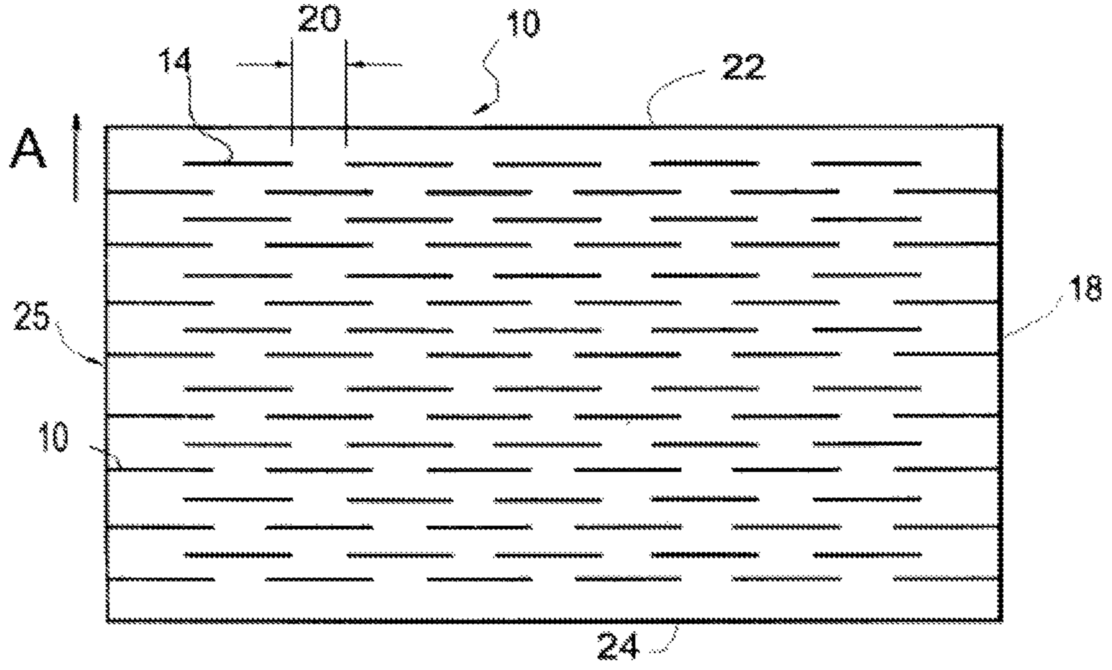
FIG. 3(A) Background Art
FIG. 3(A) is a plan view of an illustrative slit sheet paper according to the background art in an unexpanded state, specifically corresponding to FIG. 1 of U.S. Pat. No. 5,667,871.
Figure 3B:
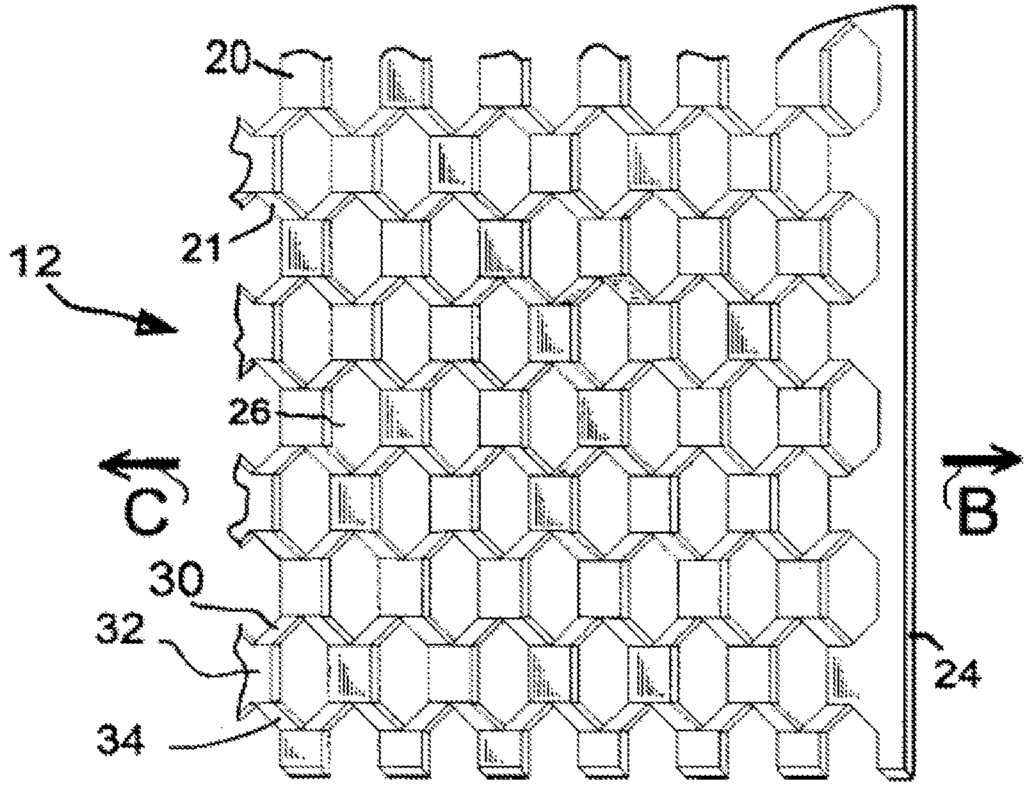
FIG. 3(B) Background Art
FIG. 3(B) is a plan view of an illustrative slit sheet paper according to the background art in an expanded state, specifically corresponding to FIG. 3 of U.S. Pat. No. 5,667,871.
Figure 4A:
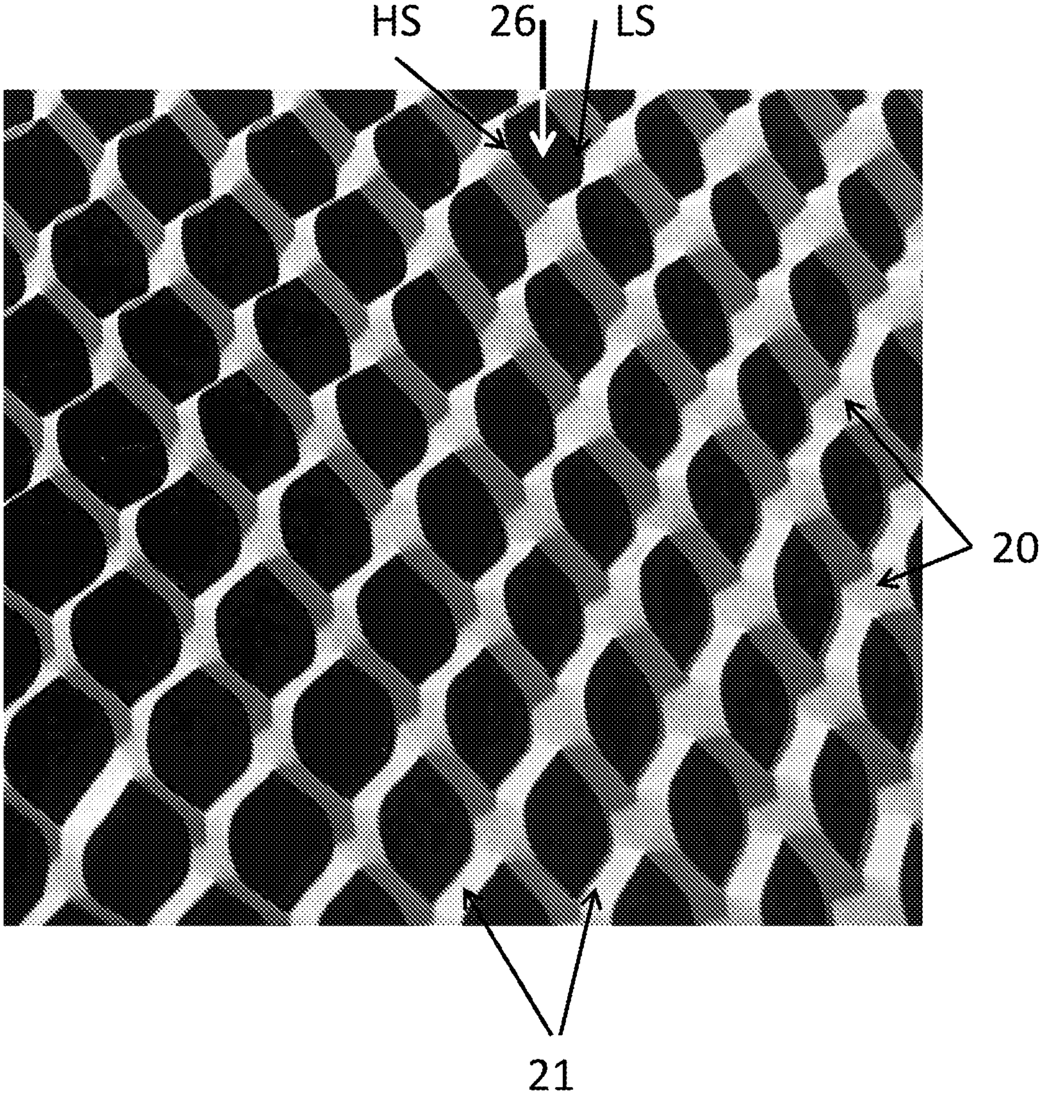
FIG. 4(A) shows a top plan view of a sample expanded slit sheet paper employing Kraft paper, which opens in a manner substantially similar to that shown in FIG. 3(B)

For reference, FIG. 4(A) shows a top plan view of a sample expanded slit sheet paper employing Kraft paper, which opens in a manner substantially similar to that shown in FIG. 3(B), discussed above. In particular, this paper includes, in an unexpanded state, an array of rows similar to that shown in FIG. 3(A), and, when expanded, the paper assumes the expansion pattern as shown in FIG. 4(A). As shown in FIG. 4(A), the expansion pattern includes the formation of substantially flat land portions 20 which tilted at an angle, and which extend across a width of the expanded sheet, along with leg portions 21, with each land portion having four respective leg portions 21 extending therefrom.

Figure 4B:
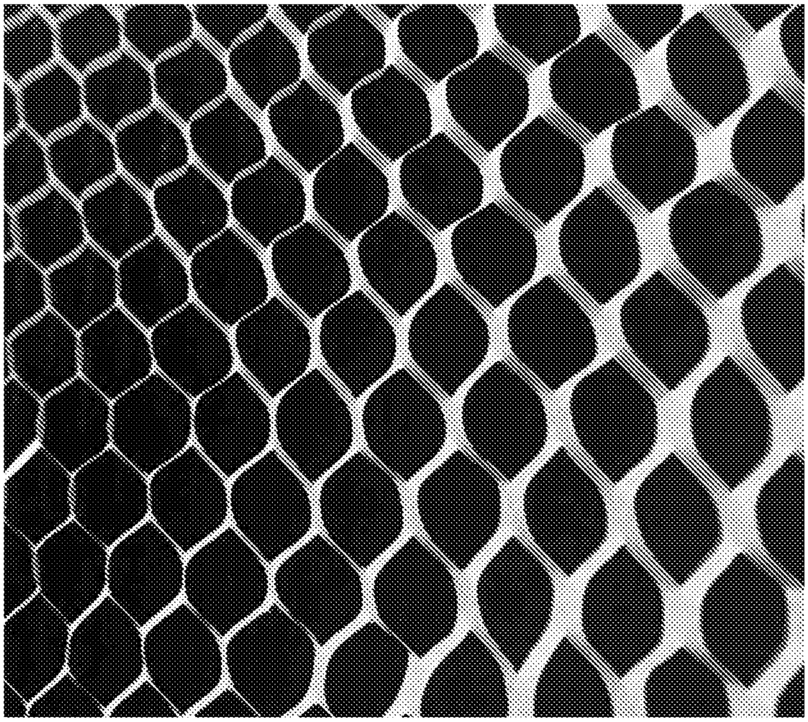
FIG. 4(B) shows a top view of the same expanded slit sheet paper shown in FIG. 4(A) taken at an angle to the plane of the expanded paper, such as to look directly into the expanded cells of the paper.

For further reference, FIG. 4(B) shows a top view of the same expanded slit sheet paper shown in FIG. 4(A) taken at an angle to the plane of the expanded paper, such as to look directly into the expanded cells of the paper (i.e., taken at an angle substantially parallel to the angle of tilt of the land portions 20. As shown, at this angle, the expansion pattern forms substantially hexagonal cells. For further reference FIG. 4(C) shows a top view of the same expanded slit sheet paper shown in FIGS. 4(A) and 4(B), but taken an angle to the plane of the expanded paper opposite to that of the angle shown in FIG. 4(B), such that the cell openings are obstructed from view by the broad sides of the land portions 20 and the leg portions 21.

Figure 4C:
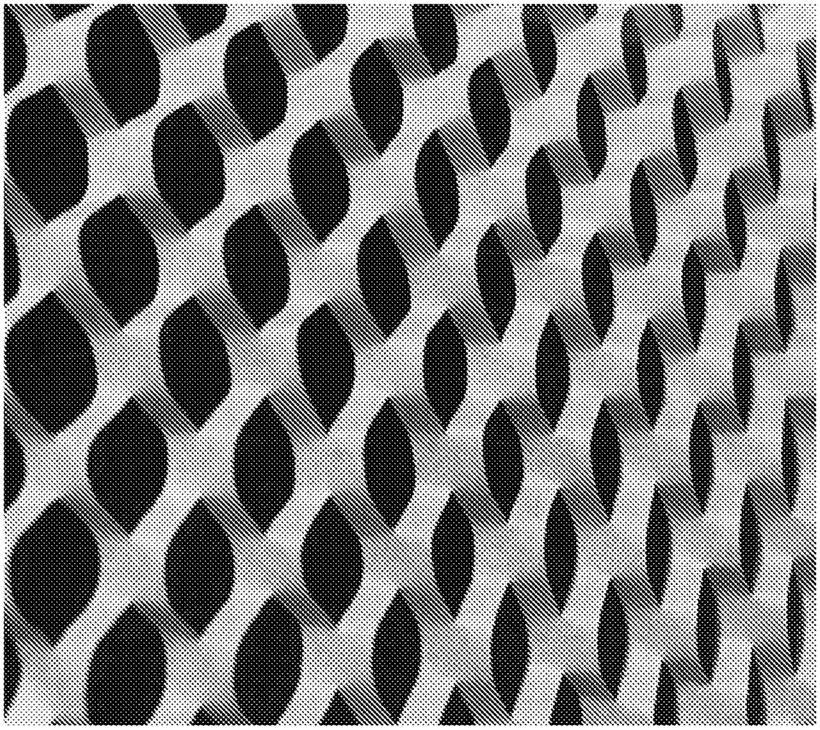
FIG. 4(C) shows a top view of the same expanded slit sheet paper shown in FIGS. 4(A) and 4(B), but taken an angle to the plane of the expanded paper opposite to that of the angle shown in FIG. 4(B)
Figure 4D:
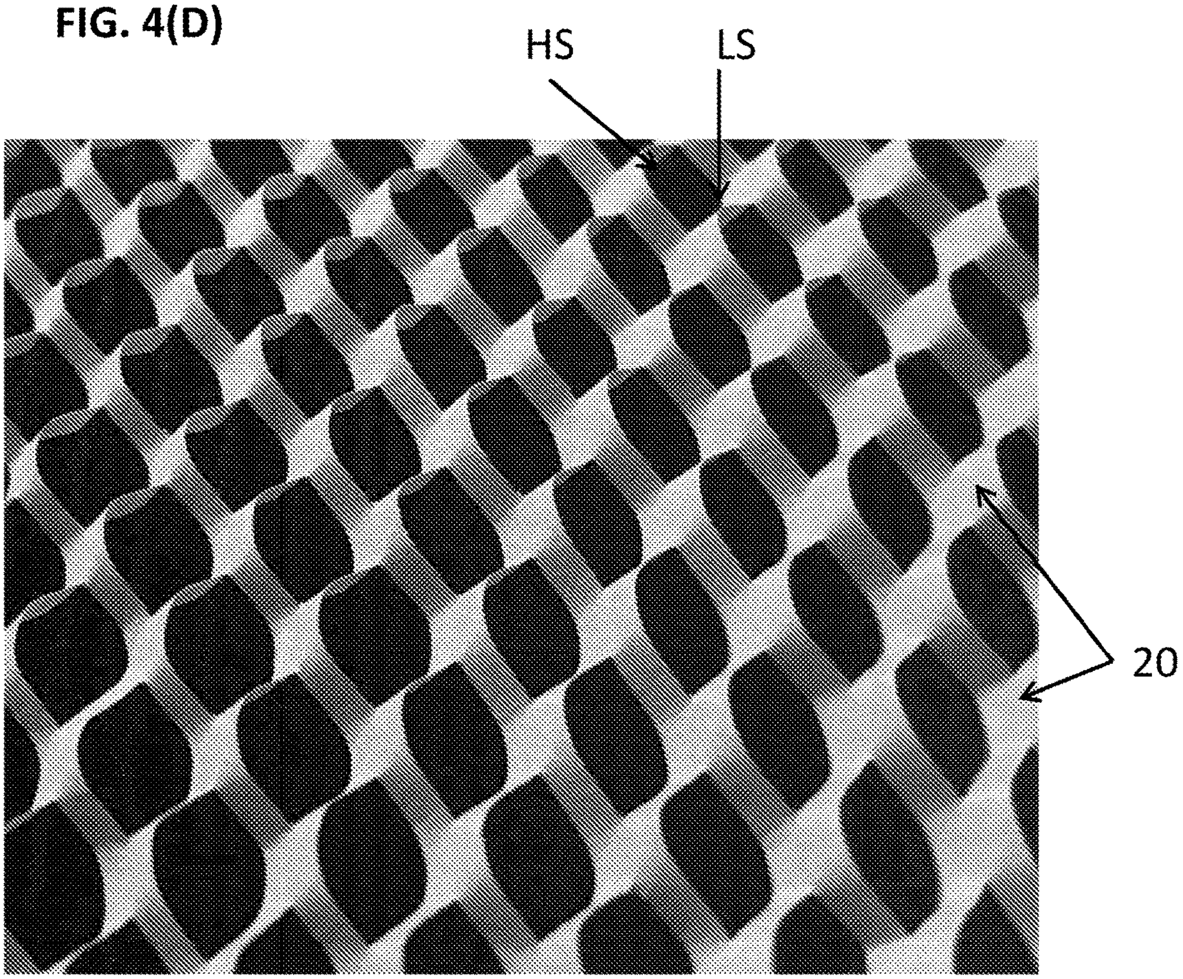
FIG. 4(D), shows a top view of the same expanded slit sheet paper shown in FIGS. 4(A)-4(C), but taken from an angle to the plane of the expanded paper from a position lower to the plane of the paper proximate the lower end of FIG. 4(D)

For even further reference, FIG. 4(D), shows a top view of the same expanded slit sheet paper shown in FIGS. 4(A)-4(C), but taken from an angle to the plane of the expanded paper from a position lower to the plane of the paper proximate the lower end of FIG. 4(D). This view helps to demonstrate how the land portions 20 extend at a consistent angle, with the left edge of each land portion being at a lowest position and the right edge of each land portion being at a highest position, such as to extend upward at an inclination from left to right sides of the land portion as shown in FIG. 4(D). As shown in FIG. 4(D), this expansion pattern creates an array of open cell openings 26, each having a high side HS at a left side of the open cell and a low side LS at a right of the open cell as shown in FIG. 4(D).

In some embodiments of the present invention which employ a novel slit pattern as described herein, an expansion pattern similar to that shown in FIGS. 4(A)-4(D) can be employed. For example, in some embodiments with smaller slit lengths, such as, e.g., with some implementations of the embodiments of Examples A to Example I in Table A below, the slit sheet paper can be configured to assume an expansion pattern similar to that shown in FIGS. 4(A)-4(D), referred to herein as a "normal expansion pattern."

Figure 5A:
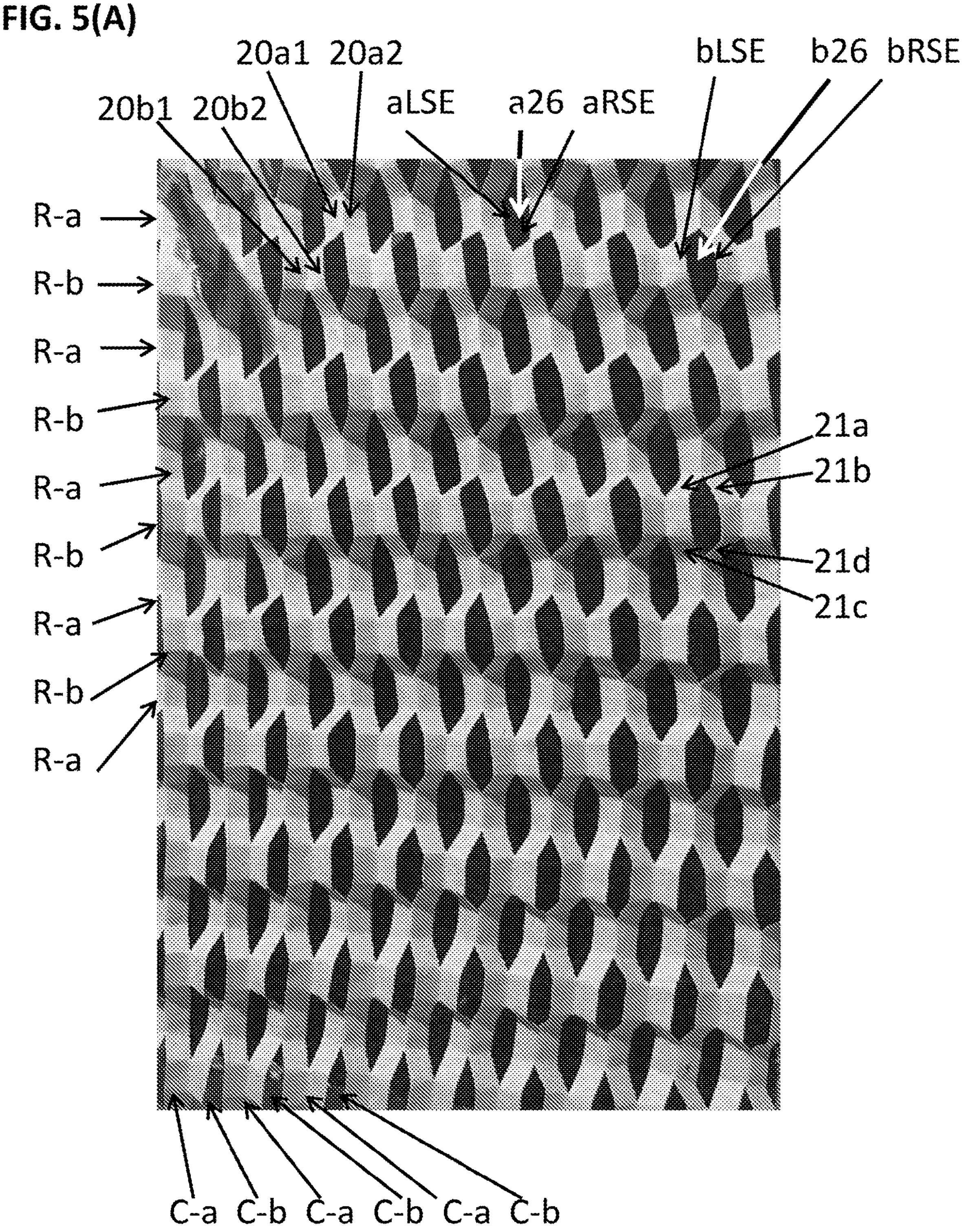
FIG. 5(A) shows a top plan view of a novel alternating row expansion pattern of an expanded slit sheet paper according to some preferred embodiments of the present invention.
Figure 5B:
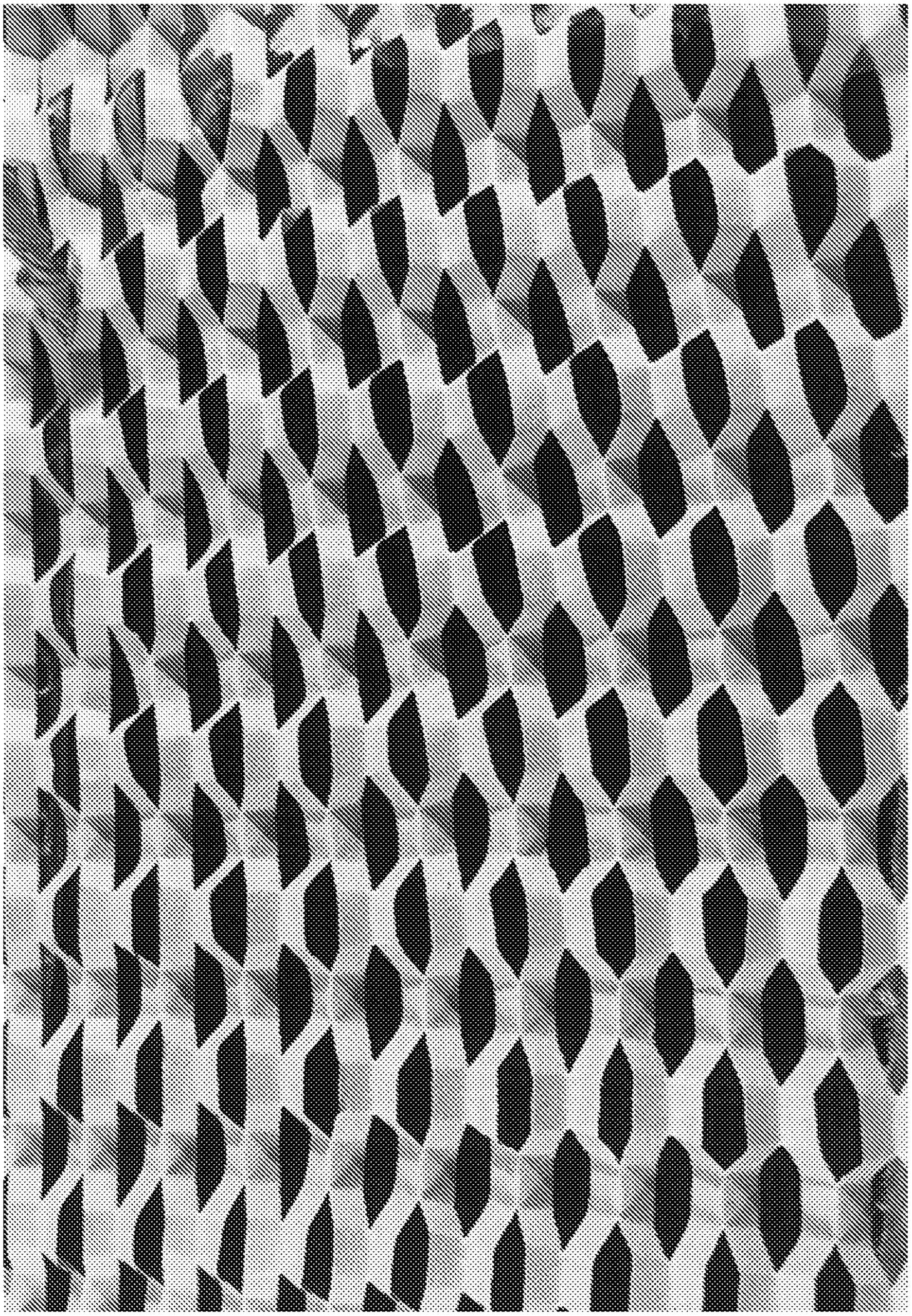
FIG. 5(B) shows a top view of the expanded slit sheet paper shown in FIG. 5(A) taken at an angle to the plane of the paper, such as to look at the expanded slit sheet paper from a top right side of the view in FIG. 5(A)
Figure 5C:
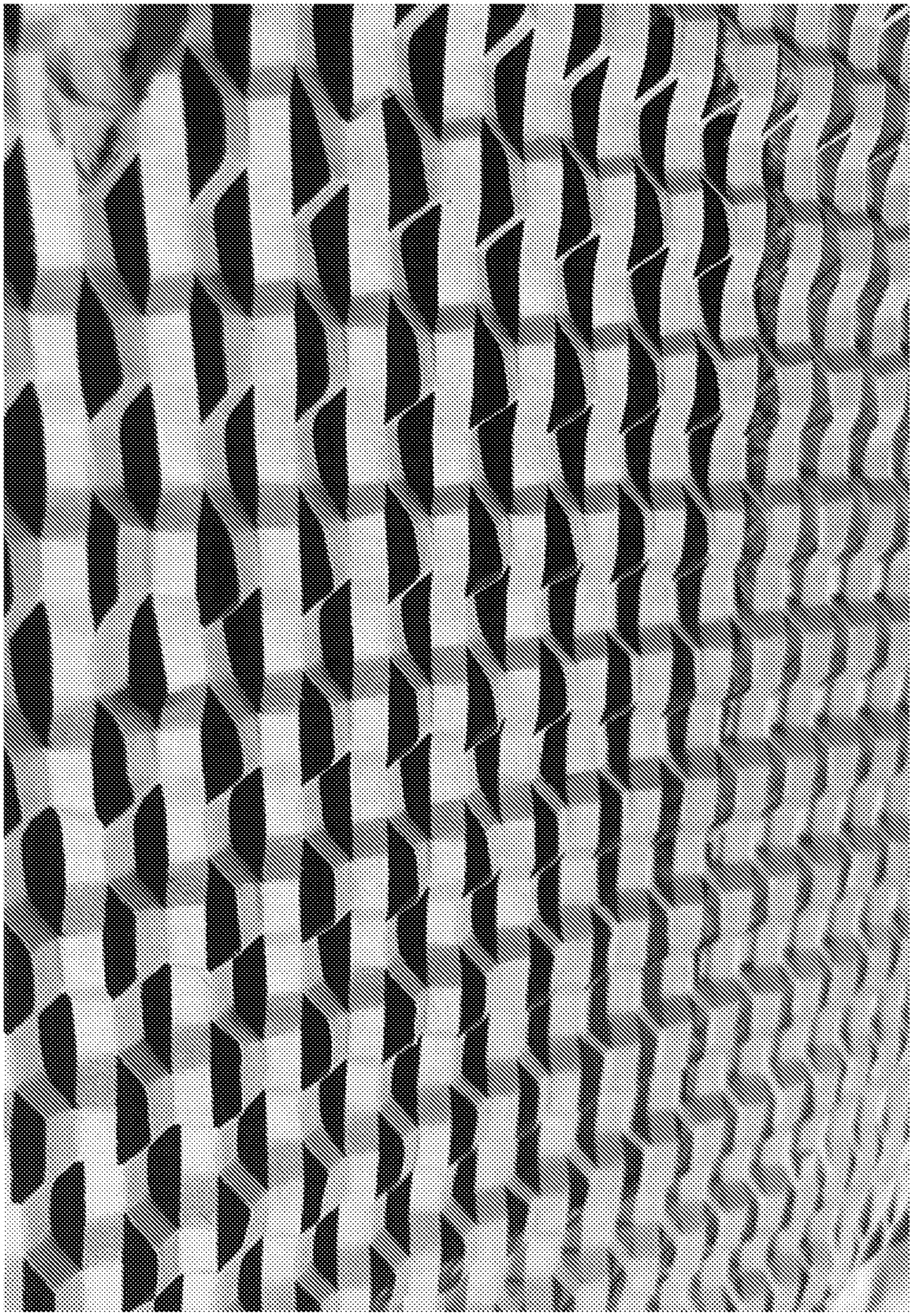
FIG. 5(C) shows a top view of the expanded slit sheet paper shown in FIG. 5(A) taken at an angle to the plane of the paper, such as to look at the expanded slit sheet paper from a top left side of the view in FIG. 5(A) and at a lower angle than that shown in FIG. 5(B)
Figure 5D:
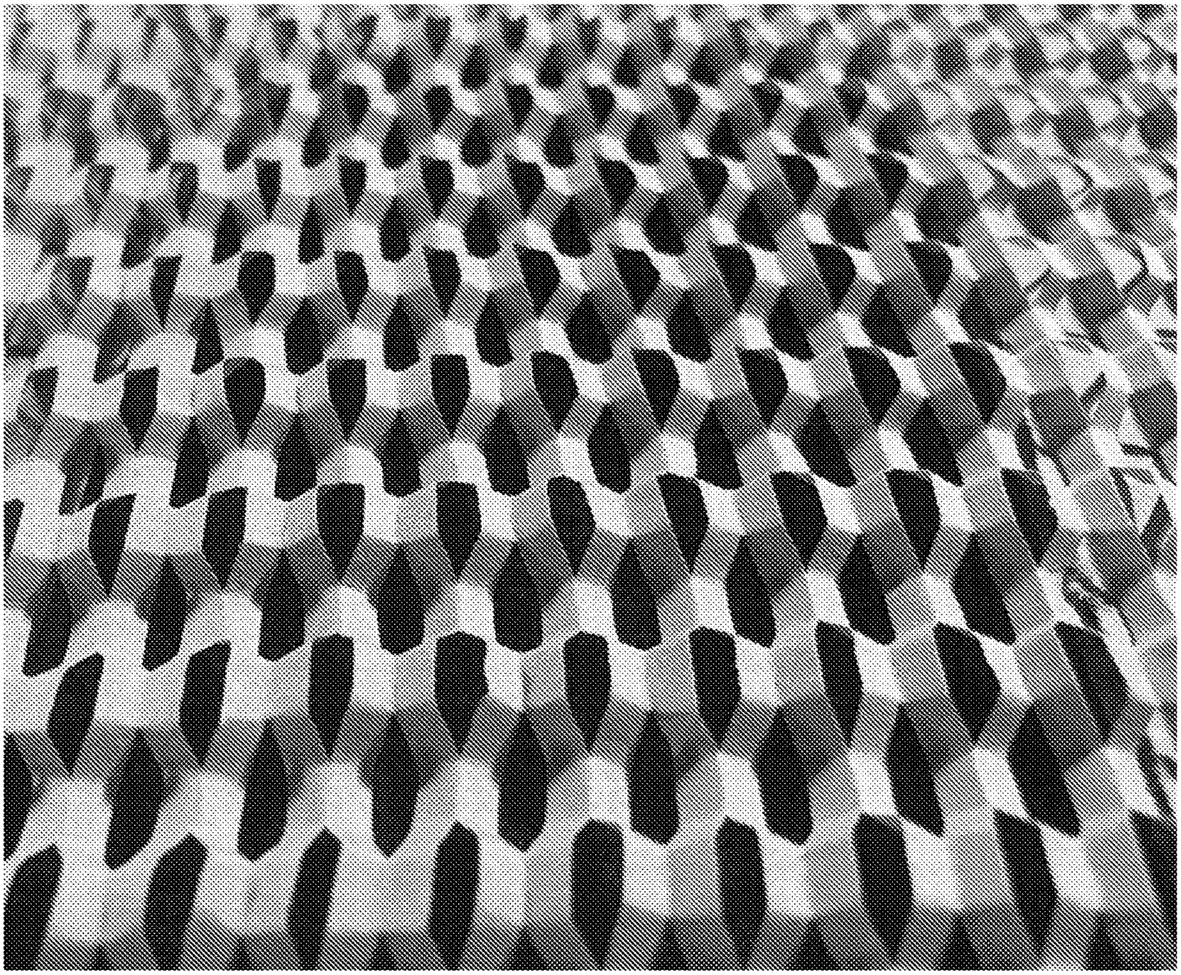
FIG. 5(D) shows a top view of the expanded slit sheet paper shown in FIG. 5(A) taken at an angle to the plane of the paper, such as to look at the expanded slit sheet paper at an angle from a lower side of the view in FIG. 5(A)
Figure 5E:
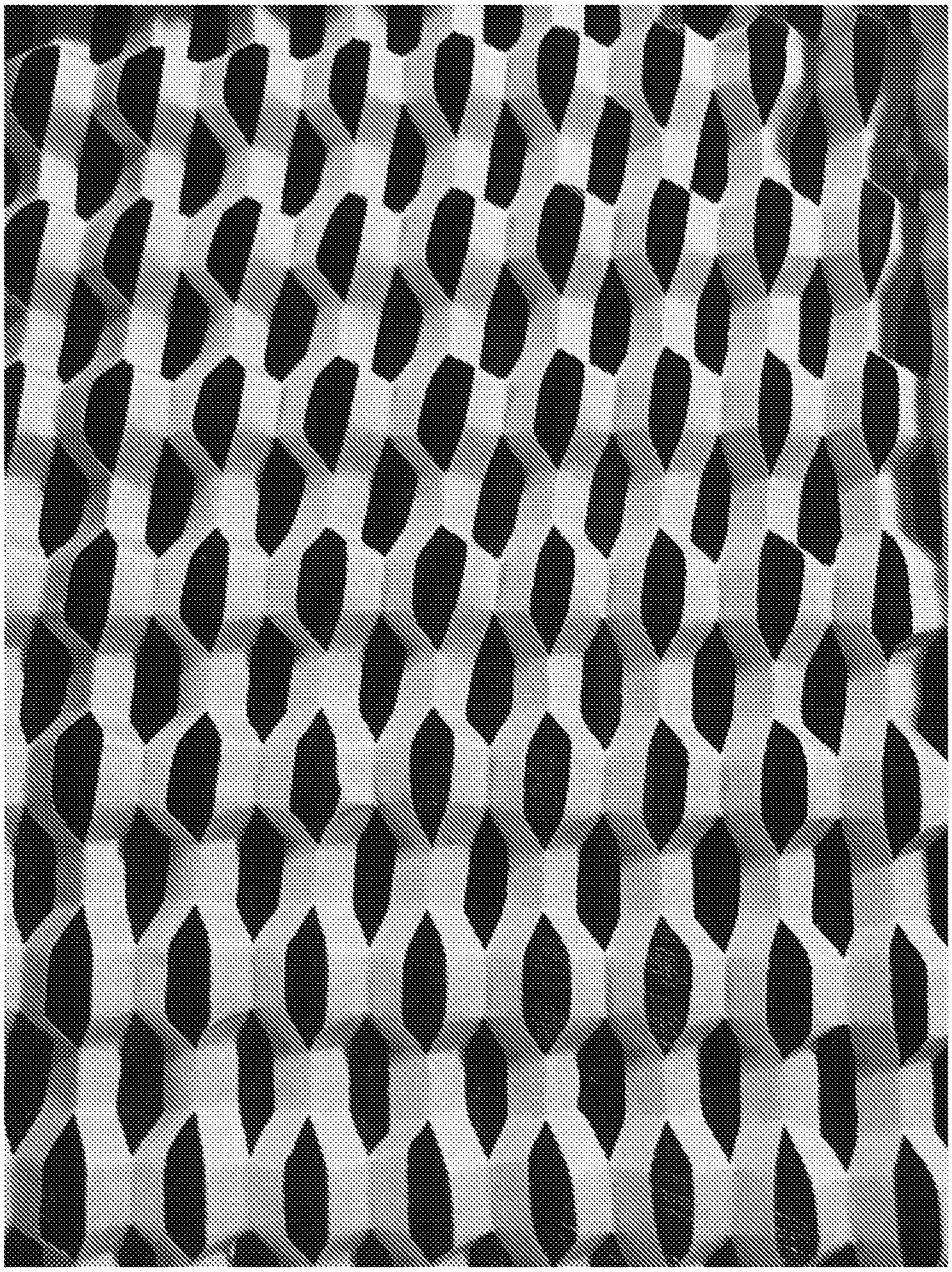
FIG. 5(E) shows a rear plan view of the expanded slit sheet paper shown in FIG. 5(A) from the opposite side of the expanded slit sheet paper (i.e., looking upward behind the expanded slit sheet paper in the view of FIG. 5(A)
Figure 5F:
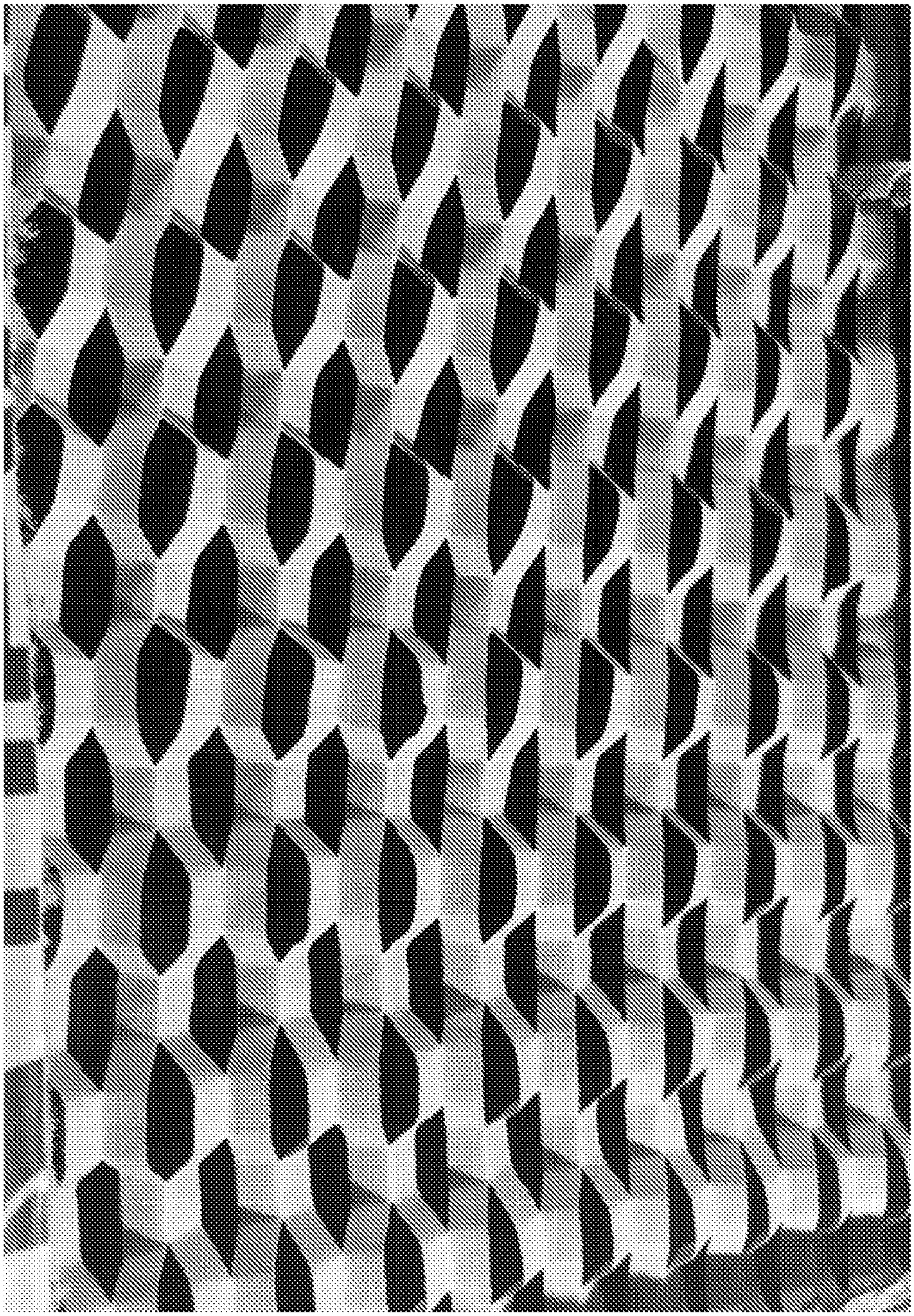
FIG. 5(F) shows a rear view of the expanded slit sheet paper shown in FIG. 5(A) from the opposite side of the expanded slit sheet paper (i.e., looking upward behind the expanded slit sheet paper in the view of FIG. 5(A)) and taken at an angle to the plane of the paper, such as to look at the expanded slit sheet paper from a bottom left side of the view in FIG. 5(E)
Figure 5G:
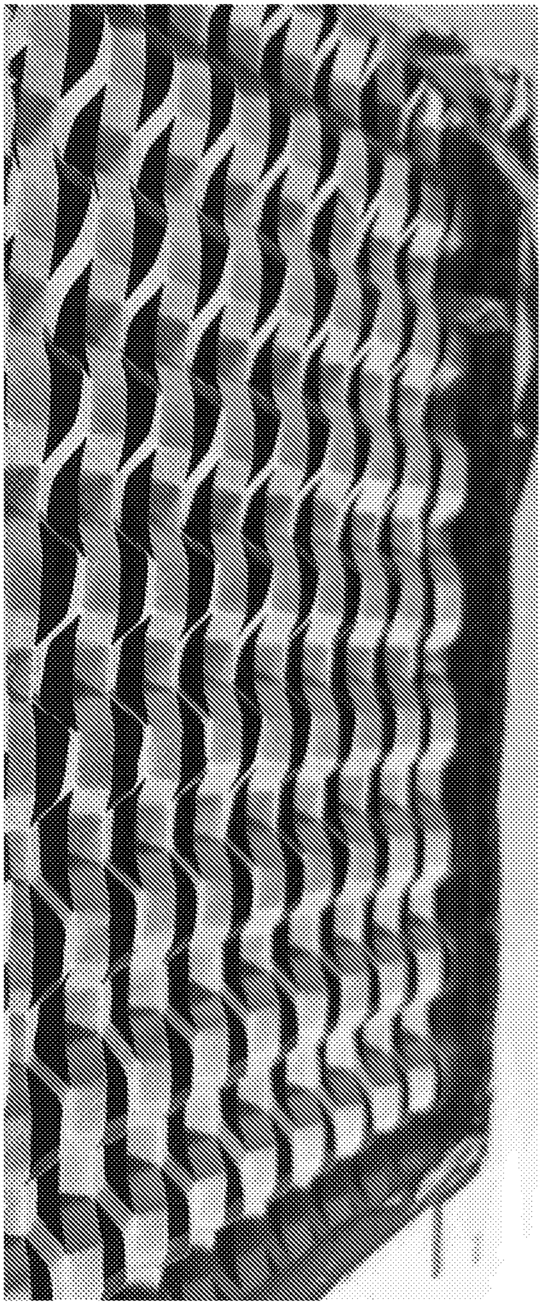
FIG. 5(G) shows a rear view of the expanded slit sheet paper shown in FIG. 5(A) from a direction similar to that shown in FIG. 5(F) except at an angle closer to the plane of the expanded slit sheet paper such as to more clearly depict the alternating row pattern of the expanded slit sheet paper.
Figure 5H:
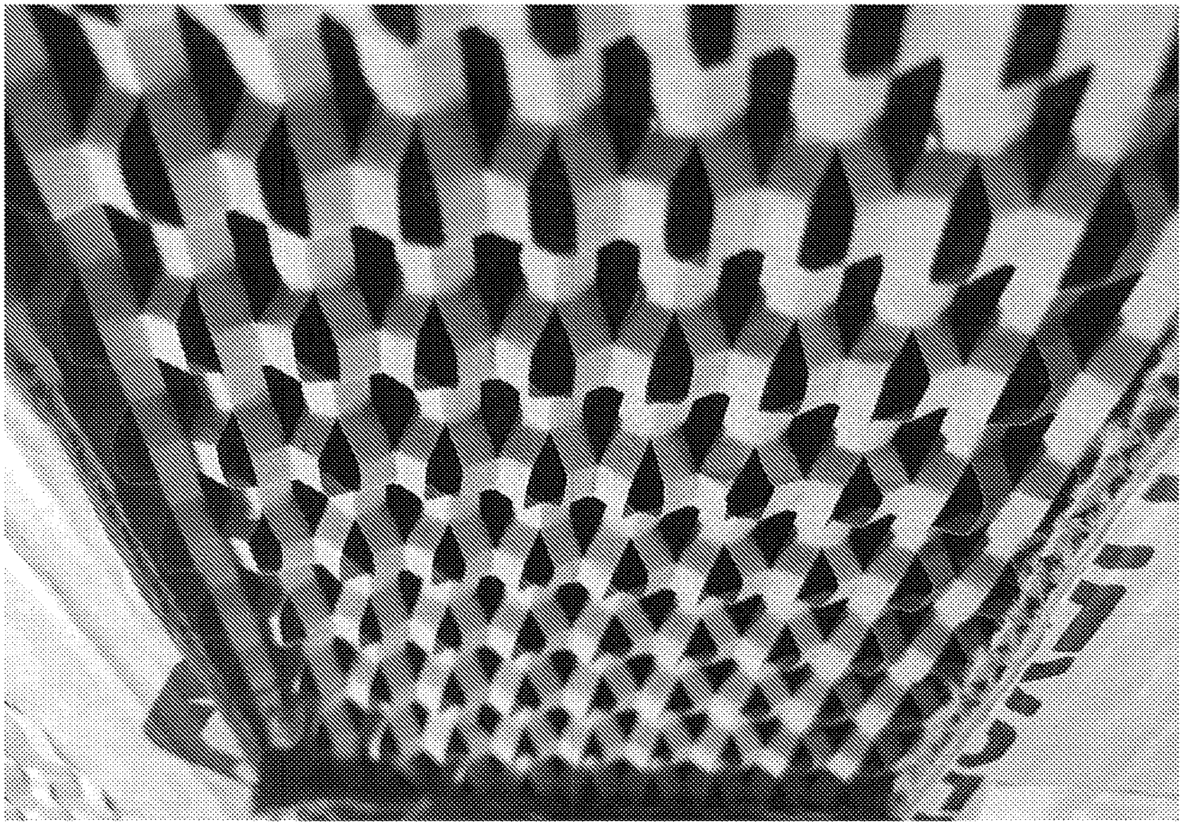
FIG. 5(H) shows a rear view of the expanded slit sheet paper shown in FIG. 5(A) taken at an angle to the plane of the paper, such as to look at the expanded slit sheet paper at an angle from a top side of the view in FIG. 5(E)

However, in some embodiments of the present invention, an expansion pattern similar to that shown in FIG. 5(A) can be employed. FIG. 5(A) shows a novel expansion pattern according to some preferred embodiments of the present invention, referred to herein as an "alternating row expansion pattern." Although some of the preferred embodiments of the present invention will include such a novel "alternating row expansion pattern," this type of expansion pattern is not required to be employed in all embodiments of the invention.

Moreover, while the alternating row expansion pattern can be employed in some preferred embodiments of the invention that include novel reduced-sized slit patterns described herein, this alternating row expansion pattern provides a new and advantageous inventive feature that can be implemented in the context of any desired slit size patterns, such as, e.g., slit size patterns with 0.5 inch slit lengths or even larger in some preferred embodiments.

Notably, this type of alternating row expansion pattern can be achieved by employing an extensible slit sheet paper from an extensible paper that has sufficient extensibility characteristics. Towards that end, the extensibility preferably is adjusted to have sufficient extensibility in both the machine direction and the cross direction to achieve such an alternating row expansion pattern. For example, with a slit sheet paper having 0.5 inch slit lengths, 0.1875 land lengths (between slits within the same row), and row spacing of 0.125 inches, this type of alternating row expansion pattern has been achieved by employing extensible paper having an extensibility of both i) 8.8 in the machine direction and ii) 8.8 in the cross direction. In some examples, this expansion pattern can be achieved employing 30 #, 40 # or 50 # extensible paper sheets having such a slit arrangement.

In some other embodiments, with such a slit sheet paper having these 0.5 inch slit lengths, extensibility of at least about 6% in both the machine direction and the cross direction can advantageously achieve such an alternating row expansion pattern.

In some preferred embodiments, such an alternating row expansion pattern can be achieved with slit patterns employing extensible paper that is extensible in a machine direction in a range of at least 5% and in a cross direction in a range of at least 5%, or, in some more preferred embodiments, that is extensible in a machine direction in a range of at least 6% and in a cross direction in a range of at least 6%, or, in some more preferred embodiments, that is extensible in a machine direction in a range of at least 7% and in a cross direction in a range of at least 7%, or, in some more preferred embodiments, that is extensible in a machine direction in a range of at least 8% and in a cross direction in a range of at least 8%.

Notably, the present inventor discovered that this novel alternating row expansion pattern could be created by implementation of extensible paper even with the same original slit pattern of an unexpanded sheet. In particular, even when the same slit pattern arrangement is provided on an unexpanded paper (including slit lengths, spacing between slits in the same rows of slits, and spacings between adjacent rows of slits), the present inventor discovered that the expansion pattern could be adjusted so as to achieve an alternating row expansion pattern by, e.g., modifying the paper to comprising an extensible paper.

As illustrated in FIG. 5(A), the alternating row expansion pattern includes alternating rows (rows R-a and rows R-b) with bottom-side cell openings a26 and top-side cell openings b26. In particular, as shown, the cell openings a26 in the rows R-a are situated on the bottom side of the expanded paper sheet (i.e., on opposite side or far side from the point of view of FIG. 5(A), or, downward into the page view), and the cell openings b26 in the rows R-b are situated on the top side of the expanded paper sheet (i.e., on the near or close side to the point of view of FIG. 5(A)).

As also illustrated in FIG. 5(A), the land portions that are formed at the regions between the ends of the slits in the same row of slits are formed differently than the land portions 20 of the embodiment describe in relation to, e.g., FIG. 4(A). Notably, rather than assuming an angle that extends consistently upward or downward like the lands 20 of FIG. 4(A), the land portions of FIG. 5(A) include upward and downward facing portions. That is, each land portion includes a portion that extends upward, and a portion that extends downward. Moreover, each land portion in FIG. 5(A) includes a creased or angled portion aligned in between adjacent slits within the same row of slits around which the angles of incline between the two portions of the land portion changes. For example, as shown in FIG. 5(A), the land portions in rows R-a include a first portion **20*a*1 that extends from an edge of an open cell a26 at a left side of the land portion upwardly to the creased or angled portion at the center of the land portion, and a second portion 20*a*2 that extends from the creased or angled portion at the center of the land portion downwardly to an edge of an open cell a26 at a right side of the land portion. As shown in FIG. 5(A), all of the land portions within the row R-a include a similar up-and-down configuration as shown in the figure, in which the creased or angle portion at the center of the land portion forms an apex or top ridge of the land portion that is at a highest point of the land portion in a direction towards the top side of the expanded paper sheet (i.e., closest to the close side to the point of view of FIG. 5**(A)).

Similarly, as also shown in FIG. 5(A), all of the land portions within the row R-b include an opposite "down-and-up" configuration as shown in the figure, in which a creased or angle portion at the center of the land portion forms a bottom ridge of the land portion that is at a lowest point of the land portion in a direction towards the bottom side of the expanded paper sheet (i.e., farthest from the close side to the point of view of FIG. 5(A)). In particular, as shown in FIG. 5(A), the land portions in rows R-b include a first portion 20*b*1 that extends from an edge of an open cell b26 at a left side of the land portion downwardly to the creased or angled portion at the center of the land portion, and a second portion 20*b*2 that extends from the creased or angled portion at the center of the land portion upwardly to an edge of an open cell b26 at a right side of the land portion. As shown in FIG. 5(A), all of the land portions within the row R-b include a similar down-and-up configuration as shown in the figure.

Furthermore, in the expansion pattern of FIG. 4(A), the leg portions extending from a first side of the land portion extend in different directions. In particular, this includes first legs extending from a top edge of the land portion extending upwards towards a close side of the expanded paper (e.g., in a direction towards the top left of FIG. 4(A), and second legs extending from that top edge of the land portion extending downwards towards a far side of the expanded paper (e.g., in a direction towards the top right of FIG. 4(A)). In addition, this also includes third legs extending from a bottom edge of the land portion extending upwards towards a close side of the expanded paper (e.g., in a direction towards the bottom left of FIG. 4(A), and forth legs extending from that bottom edge of the land portion extending downwards towards a far side of the expanded paper (e.g., in a direction towards the lower right of FIG. 4(A)).

However, in contrast to the embodiment shown in FIG. 4(A), in the alternating row expansion pattern shown in FIG. 5(A), the leg portions extending from a first side of the land portion extend in similar directions. In particular, the leg portions extend in a manner to create the alternating rows R-a and R-b, wherein these alternating rows R-a and R-b are located at opposing sides of the expanded slit sheet in a width direction of the sheet—that is, with the rows R-a being at a far side of the expanded slit sheet in the width direction as viewed in FIG. 5(A) and with the rows R-b being at a close side of the expanded slit sheet in the width direction of the sheet.

In particular, as shown in FIG. 5(A), the legs include: a) first legs 21*a* extending from a top edge of a land portion 20*b*2 downwardly to a land portion 20*a*1; b) second legs 20*b* extending from a top edge of a land portion 20*b*1 downwardly to a land portion 20*a*2; c) third legs 21*c* extending from a bottom edge of a land portion 20*b*2 downwardly to another land portion 20*a*1; and d) fourth legs 20*d* extending from a bottom edge of a land portion 20*b*1 downwardly to another land portion 20*a*2.

The present inventor has also discovered that this alternating row expansion pattern has a number of substantial advantages and benefits over the expansion pattern shown in FIG. 4(A). First, the alternating row expansion pattern has substantial aesthetic benefits and is more aesthetically appealing and interesting. Second, the alternating row expansion pattern creates an expansion pattern that is more visually obstructive at a variety of angles. Second, the alternating row expansion pattern creates an expansion pattern that has improved cushioning and operational characteristics.

While the open cells 26 of the example shown in FIG. 4(A) creates cells having a high side HS at a close side of the expanded paper and a low side LS at a far side of the expanded paper (as shown in FIG. 4(A)), the open cells a26 and b26 shown in FIG. 5(A) create cells having both sides at similar heights (i.e., either at a high side such as, e.g., cells b26 or at a low side such as, e.g., cells a26). Among other things, forces applied to the periphery of the open cells a26 and b26 are, thus, generally applied more evenly on opposite sides of the open cells, rather than being applied at a single side of the open cells of the opens cells 26 shown in FIG. 4(A).

Figure 6A:
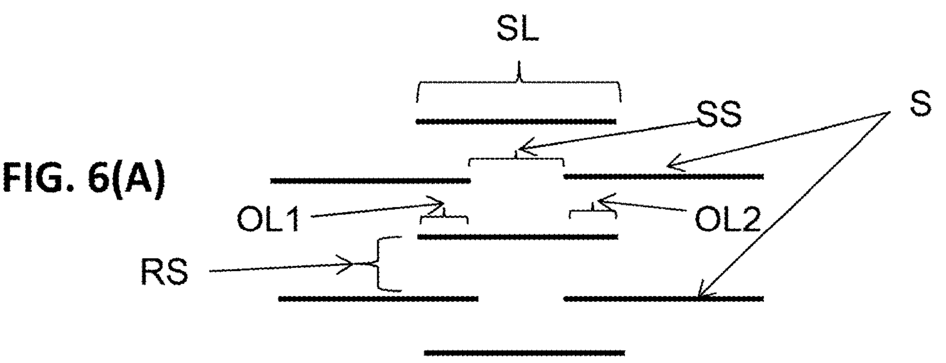
Figure 6B:
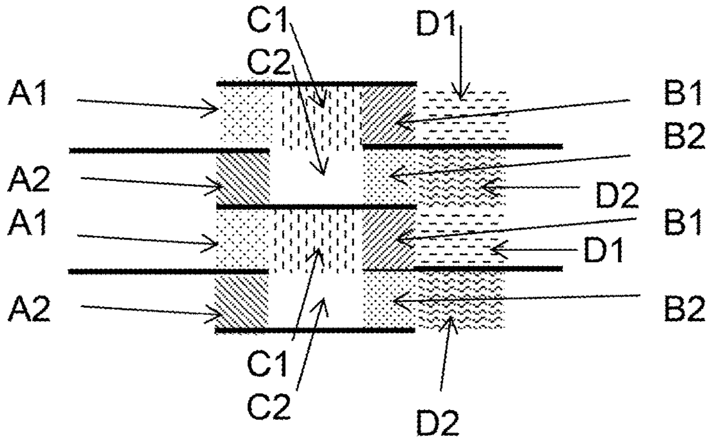
Figure 6C:
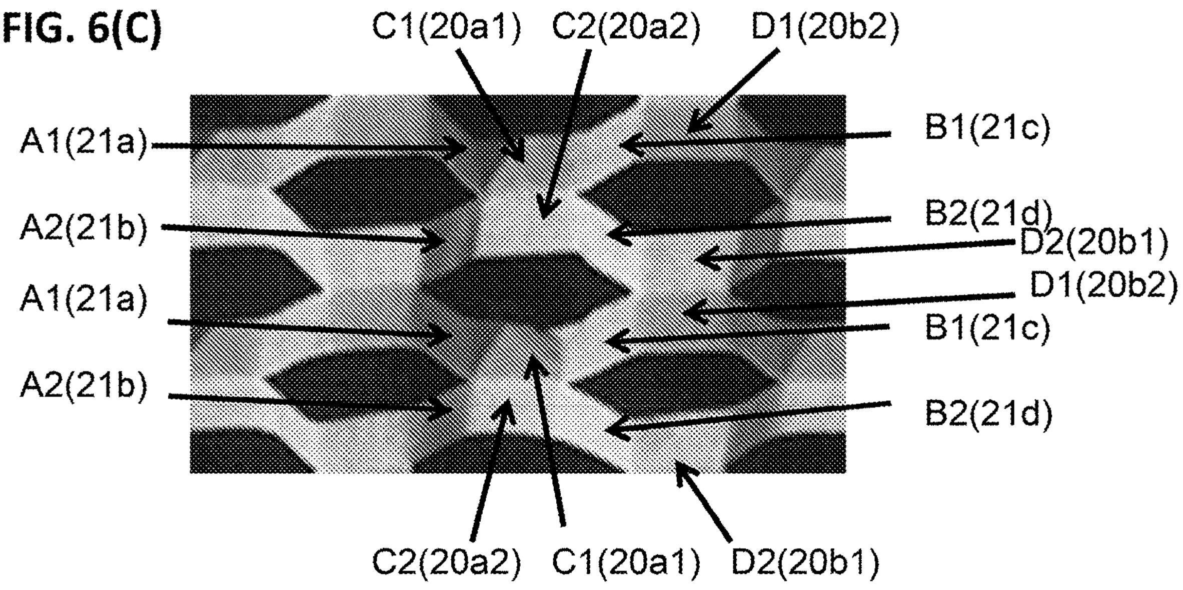

For further reference, FIGS. 6(A) to 6(C) provide an explanatory diagram demonstrating the formation of the alternating row expansion pattern according to the preferred embodiments of the invention. First, FIG. 6(A) shows an illustrative slit pattern formed within a sheet of paper. In some embodiments, the slit pattern is generally similar to that shown in FIG. 3(A), discussed above. However, as discussed below, in the most preferred embodiments of the present invention, the slit pattern has novel and advantageous slit and slit pattern dimensions and relationships as discussed further below.

As shown in FIG. 6(A), the slits include a plurality of rows of slits extending substantially horizontally across the page of view of the figure. Although only 7 slits S are depicted (for explanatory purposes), it should be appreciated that the product would include rows of slits extending entirely across the paper sheet. As shown, the slits preferably have a common slit length SL (i.e., all slits preferably have a like slit length), a common slit spacing SS between ends of the slits in the same row of slits (i.e., all slit spacings preferably have a like length), and a common row spacing RS between adjacent rows of slits (i.e., all spacings between rows preferably have a like distance). Additionally, as also shown, the extent of overlap between slits of adjacent rows preferably includes equal sized spacings OL1 and OL2 (i.e., the slits in adjacent rows are preferably symmetrically aligned such as to create symmetrical cells upon expansion).

FIG. 6(B) shows the slit pattern of FIG. 6(A) with regions of the paper prior to expansion highlighted for reference. Towards that end, the regions A1, A2, B1, B2, C1, C2, D1 and D2 are shaded in the figure to facilitate reference. However, it should be appreciated that in this unexpanded state shown in FIG. 6(B), these regions are all flat or planar regions along the plane of the original unexpanded sheet of paper.

As shown in FIG. 6(C), upon expansion, the regions slits S are caused to open and create open cells a26 and b26. Additionally, as depicted in FIG. 6(C), the regions A1 are caused to assume the orientations of legs 21*a* discussed above, the regions A2 are caused to assume the orientations of legs 21*b* discussed above, the regions B1 are caused to assume the orientations of legs 21*c* discussed above, the regions B2 are caused to assume the orientations of claim 21d discussed above, the regions C1 are caused to assume the orientations of land portions 20*a*1 discussed above, the regions C2 are caused to assume the orientations of land portions 20*a*2 discussed above, the regions D1 are caused to assume the orientations of land portions 20*b*2 discussed above, and the regions D2 are caused to assume the orientations of land portions 20*b*1 discussed above.

In the embodiment shown in, e.g., FIG. 5(A) employing an alternating row expansion pattern, the open cells a26 and b26, form hexagonal peripheries that are "bent" at a central region such as to not form an regular hexagon (i.e., both equilateral and equiangular), but, rather, to form a hexagonal shape in which the opposing land portions 20*b*2 and 20*b*1 are closer to one another. In contrast, as best shown in, e.g., FIG. 4(B), the prior expansion patter leads to substantially regular hexagons. Notably, the hexagonal open cells a26 and b26 include a first half that extends along substantially a first plane with edges along one of the land portions and two of the leg portions and a second half that extends along substantially a second plane with edges along another of the land portions and two of the leg portions. For example, an open cell b26 includes a first half along a first plane delineated by an edge of the leg 21*c*, an edge of the land portion 20*b*2, and an edge of the leg 21*a*, and a second half along a second plane delineated by an edge of the leg 21*d*, an edge of the land portion 20*b*1, and an edge of the leg 21*b*. In this application, such a hexagon that is bent between two planes referred to as a "bent hexagon." With reference to FIGS. 5(A) and 6(C), the bent hexagons of the cells b26 are formed so as to open upwardly (i.e., such that the angle between both of the planes opens upwardly) while the bent hexagons of the cells a26 are formed so as to open downwardly (i.e., such that the angle between both of the planes opens downwardly and oppositely to that of the angle of the bent hexagons of the cells b26).

Further Discussion of Preferred Embodiments

FIG. 1 is an explanatory planar view showing two slit patterns and the resulting number of cells per square foot. Towards that end, FIG. 1 is an explanatory plan view of the layout between the standard 0.5" wide cut 100 (i.e., a standard expandable slit sheet with 0.5 long slits) and an embodiment of the present application having a 0.45" wide cut 101 (i.e., an expandable slit sheet according to some embodiments herein having 0.45 long slits). In this illustrative figure, the square lines 102 and 103 are the outline of an illustrative 12"×12" box depicting 1 square foot of expanded slit sheet material. As illustrated by this exemplary explanatory view, the reduction of slit length from 0.5" to 0.45" results in a 23.7% greater number of legs in the 0.45" slit length example 101.

FIG. 2 is an explanatory side view depicting a cell structure of the expanded slit sheet material of the background art 204 and two varying cell sizes according to some embodiments of the present invention, 205 and 206, that result in varied heights of the expanded slit sheet material. Reference lines 200, 201, and 203 show the varying heights of the cell structures with line 207 the base line. In this illustrative explanatory figure, the expanded slit sheet 204 has a standard 0.5" slit and novel expanded slit sheet 205 according to a first embodiment is 10% smaller and the expanded slit sheet 206 is 10% smaller as compared to 204.

In order to expand an expandable slit sheet paper, an expansion force is required to pull the paper to cause the paper to expand and to open the cells. Existing expandable slit sheet paper can be somewhat difficult to expand and requires a substantially higher force for expansion. Additionally, existing expandable slit sheet paper requires a larger slit length in order to enable opening of the cells. Varying slit patterns with expanded slit sheet material require varying force to stretch. The present slit pattern used in the market requires approximately 6 pounds of pulling force for slit material that is 15 inches wide utilizing 50 # Kraft paper. However, the present inventor has discovered that extensible paper reduces the force required for the same slit pattern and paper weight to, e.g., 2 pounds.

The present inventor has also discovered that this decrease enables further slit pattern opportunities that can provide greater resiliency and a reduced thickness is desired where, in the past, they would be too difficult to stretch manually and provide a burden to the automated expanding equipment. In general terms, the present inventor has discovered that a 10% reduction in slit, land, and row size increases the number of supporting legs by 23.7%—a more than doubling of the strength of the material. This provides cushioning solutions where greater resiliency of the same or smaller leg height can be accomplished.

Additionally, and well known in paper die cutting art, leg height impacts stiffness. As the leg height is reduced, the leg becomes stiffer. This is due to the fiber length that becomes more difficult to bow or flex as the height becomes shorter. According to preferred embodiments of the present invention, the leg height, the number of legs per square foot, and the paper weight is balanced to provide optimal cushioning while providing the least amount of pulling strength to open.

The automated equipment is also impacted with a heavy pulling strength as it requires more maintenance changes to the hook rollers due to them wearing out proportionally to the pulling force required. With the advent of the present inventor's discovery of the unique and unexpected advantages of extensible paper employed in expandable slit sheet products, these limitations based on pulling force are greatly diminished and enable greater market opportunities where greater strength is required.

Presently there is a move towards environmentally friendly packaging products that includes the use of non-powered equipment eliminating the need for electricity.

The use of a manual system to dispense rolls of expanded slit material that can have varying properties of cushioning and provides greater flexibility for wrapping a wider variety of weights and densities of fragile items. As an example, with the prior art slit sheet material, the number of wraps on a bottle of wine is too great for a cost advantage over bubble. However, with the present inventor's implementation of an extensible-based wrap having a greater number of legs per square foot (e.g., according to embodiments of the present invention), fewer wraps are required to obtain the same level of cushioning. Accordingly, very substantial benefits and advancements are achieved.

In some illustrative applications, the preferred embodiments of the present invention can be employed in the creation of substantially improved, novel and advantageous envelopes. Towards that end, in some embodiments, a padded envelope can be created employing aspects of the present invention, providing a reduced thickness, but increased resilience and improved crush resistance of the envelope (or pouch or bag), along with greater efficiencies of storage and freight while providing increased resiliency, and while maintaining production speed and less downtime with the use of the reduced stretching force required due to the novel use of extensible paper.

Presently, the crush strength for the current commercial pattern using a 0.5" slit is 2.2 pounds per square inch of strength.

According to some preferred embodiments of the present invention, a preferred reduced slit pattern utilizing 50 # Kraft paper with a slit pattern of 0.45" slit (i.e., length of slit), 0.1688" land (i.e., distance between adjacent slits in a lengthwise direction of the slits), 0.1125" row width (i.e., distance between adjacent rows of slits) is provided. In some embodiments, such a configuration yields 2.72-2.92 pounds of per inch of crush strength, which yields a 27% increase in strength with a 10% decrease in thickness from 0.1875" to 0.16875". In the most preferred implementations of this slit pattern, the paper employed is an extensible paper.

According to some other embodiments of the present invention, another preferred slit pattern is 0.40" slit, 0.15" land, 0.1125" row width. In some embodiments, this latter configuration yields 3.1-3.3 pounds per inch crush strength, which yields a 40% increase in crush strength with a 10% decrease in thickness from 0.1875" to 0.16875." In the most preferred implementations of this slit pattern, the paper employed is an extensible paper.

According to the preferred embodiments, this increase in strength can advantageously be used to allow for a reduced thickness of the expanded slit sheet paper, which can, thus, provide, e.g., an equivalent crush strength while providing for a reduction in overall height. For example, in the above illustrative embodiments employing a 50 # paper, the use of 40 # paper would reduce the leg stiffness, but would reduce the cost of the paper.

According to some other preferred embodiments, an expandable slit paper sheet includes a pattern of slits having slit lengths in the range from 0.30 to 0.45 inches and spaces between rows of slits in the range from 0.1125 to 0.1688. In the most preferred implementations of this slit pattern, the paper employed is an extensible paper.

According to some other preferred embodiments, an expandable slit paper sheet includes a pattern of slits having slit lengths in the range of 0.45 inches plus 5% (e.g., 0.4725 inches) to 0.45 inches minus 33% (e.g., 0.30 inches). In the most preferred implementations of this slit pattern, the paper employed is an extensible paper.

According to some other preferred embodiments, an expandable slit paper sheet includes a pattern of slits that upon expansion produces an expandable slit paper having a number of legs per square foot that is at least 20% greater than a slit paper sheet with slit lengths of 0.5 inches which is configured to create hexagonal cells (e.g., with equilateral hexagons).

According to some other preferred embodiments, an expandable slit paper sheet includes a pattern of slits that upon expansion produces an expandable slit paper having a number of legs per square foot that is at least 15% greater than a slit paper sheet with slit lengths of 0.5 inches which is configured to create hexagonal cells (e.g., with equilateral hexagons), and, more preferably, in the range from 20% to 50% greater than such slit paper with slit lengths of 0.5 inches which is configured to create hexagonal cells (e.g., with equilateral hexagons)

In the most preferred embodiments, the paper employed is an extensible paper as described herein-above. The use of such extensible paper highly advantageously enables a reduced slit pattern size in comparison to prior slit patterns. Notably, non-extensible paper has limitations in relation to the viable sizes and dimensions of the slits, and such non-extensible paper does not enable reduction in sizes to that of preferred embodiments described herein because such prior papers would be inoperable and would not adequately expand if such small sizes were attempted to be employed.

Additionally, while the present inventor has discovered novel means to improve cushioning characteristics of expandable slit sheet paper, which involves "reducing" the slit pattern dimensions, it is notable that this reduction of slit pattern dimensions is "not only" unviable with prior expandable slit sheet paper (i.e., which could not achieve such small sizes), but is also "counter-intuitive" to the existing understanding of cushioning properties afforded by such explandable slit sheet papers. Notably, the cushioning of expandable slit sheet papers is directly related to the "width" of the expandable slit sheet paper in an expanded state. Accordingly, for enhancing cushioning, those in the art have sought to actually "increase" this width of the expanded slit sheet paper. However, the present inventor discovered means by which smaller slit patterns could be achieved (e.g., via the use of the extensible paper) and that such smaller slit patterns with such extensible papers could, in fact, provide enhance cushioning despite the losses in cushioning due to the reduced "width" of the expandable slit sheet paper. Additionally, the present inventor also discovered other desirable applications and uses of such novel expandable slit sheet paper.

Notably, non-extensible expanded slit paper sheets do not operate appropriately with slit lengths of less than about 0.5 inches. Accordingly, for expandable slit paper sheets of smaller slit sizes according to the present invention, an extensible paper according to the present invention is advantageously employed.

According to some more preferred embodiments of the invention, a slit pattern is provided which includes slit lengths of 0.35" slits (i.e., the lengths of the slits), 0.13125" lands (i.e., the distances between adjacent slits in the same row of slits in a lengthwise direction of the slits), and 0.0875" row width (i.e., the distances between adjacent rows of slits). In this regard, such a slit pattern is preferably implemented within a pattern of slits similar to that shown in, e.g., FIG. 6(A), in which all of the slits of the expandable slit sheet have the same lengths, the distances between adjacent rows is consistently the same, in which the distance between slits in the same row is consistently the same, and in which the locations of the slits in adjacent rows is arranged with equal overlap to form symmetrical cells. For these embodiments, an extensible slit sheet paper is preferably employed; notably, a non-extensible paper cannot be used to viably operationally function with such a slit pattern.

While, preferably, all of the expanded slit sheet paper would include a same slit pattern throughout the sheet, in some embodiments such a pattern could be employed within a portion or region of the paper and/or some regions of the paper may potentially include some differences in the pattern. Additionally, although the slit lengths and dimensions are preferably consistently the same as indicated above, in some embodiments, there could be some variations in sizes, positions of the slits as long as operation of the product is not impeded.

In some embodiments, a slit pattern having 0.35" slits, 0.13125" lands, and 0.0875" row width can yield 3.52-3.82 pounds per inch crush strength which yields a 60% increase in crush strength with a 30% decrease in thickness from 0.1875" to 0.1125."

In some preferred implementations of all of the embodiments of the invention described above, the lands distance (i.e., the distance SS shown in FIG. 6(A) between the slits) is approximately ⅓ the length of the slits (i.e., the distance SL shown in FIG. 6(A)). When the distance SS is about ⅓ the length of the slits, the lengths of the perimeter sides of the created cell openings a26 and b26 are equal. However, in some preferred embodiments, the distance of the lands (i.e., SS) is preferably slightly greater than ⅓ the length of the slits. For example, in the lattermost embodiments above employing a 0.35" slit length, with 0.13125" land length, the ratio is approximately 0.375. Accordingly, in this example, the length of the lands are approximate 12.5% larger than ⅓ the length of the slits.

In some preferred embodiments, the lengths of the lands would be about ⅓ the length of the slits plus or minus about 25%. In some other preferred embodiments, the lengths of the lands would be about ⅓ the length of the slits plus or minus about 20%. In some preferred embodiments, the lengths of the lands would be about ⅓ the length of the slits plus or minus about 15%. In some other preferred embodiments, the lengths of the lands would be about ⅓ the length of the slits plus or minus about 10%.

In some other preferred embodiments, the lengths of the lands would be between about ⅓ the length of the slits to 25% greater than ⅓ the length of the slits. In some other preferred embodiments, the lengths of the lands would be between about ⅓ the length of the slits to 20% greater than ⅓ the length of the slits. In some other preferred embodiments, the lengths of the lands would be between about ⅓ the length of the slits to 15% greater than ⅓ the length of the slits. In some other preferred embodiments, the lengths of the lands would be between about ⅓ the length of the slits to 10% greater than ⅓ the length of the slits.

In some other preferred embodiments, the lengths of the lands would be between about 5% greater than ⅓ the length of the slits to about 25% greater than ⅓ the length of the slits. In some other preferred embodiments, the lengths of the lands would be between about 10% greater than ⅓ the length of the slits to about 20% greater than ⅓ the length of the slits. In some other preferred embodiments, the lengths of the lands would be between about 10% greater than ⅓ the length of the slits to about 15% greater than ⅓ the length of the slits. In some other preferred embodiments, the lengths of the lands are such that the slit length SL is approximately set in relation to the split spacing SS as follows: SL=2.6667×SS.

In some preferred embodiments, the dimensions of the expandable slit sheet paper are proportionally reduced from an expandable slit sheet paper having a 0.5" slit length, a ⅛" (0.125 inch) spacing between rows, and a spacing between slits within the same row (i.e., land length) of 3/16" (0.1875 inch) as follows: a) the row spacing is proportionally reduced by a ratio SL(new)/0.5 and b) the slit spacing is set at SL(new) divided by 2.6667. For example, some preferred embodiments include dimensions as set forth below Table A:

| | Slit Length (SL) | Slit Spacing (SS) | Row Spacing (RS) |
|---|---|---|---|
| Example A | 0.45 inches | 0.1687 inches | 0.1125 inches |
| Example B | 0.425 inches | 0.1594 inches | 0.1063 inches |
| Example C | 0.40 inches | 0.1500 inches | 0.1000 inches |
| Example D | 0.375 inches | 0.1406 inches | 0.09375 inches |
| Example E | 0.35 inches | 0.13125 inches | 0.0875 inches |
| Example F | 0.325 inches | 0.1219 inches | 0.0813 inches |
| Example G | 0.30 inches | 0.1125 inches | 0.0750 inches |
| Example H | 0.275 inches | 0.1031 inches | 0.0688 inches |
| Example I | 0.25 inches | 0.09375 inches | 0.0625 inches |
| Example J | 0.225 inches | 0.08438 inches | 0.0563 inches |
| Example K | 0.20 inches | 0.07500 inches | 0.05 inches |
| Example L | 0.175 inches | 0.06562 inches | 0.4375 inches |

Figure 10:
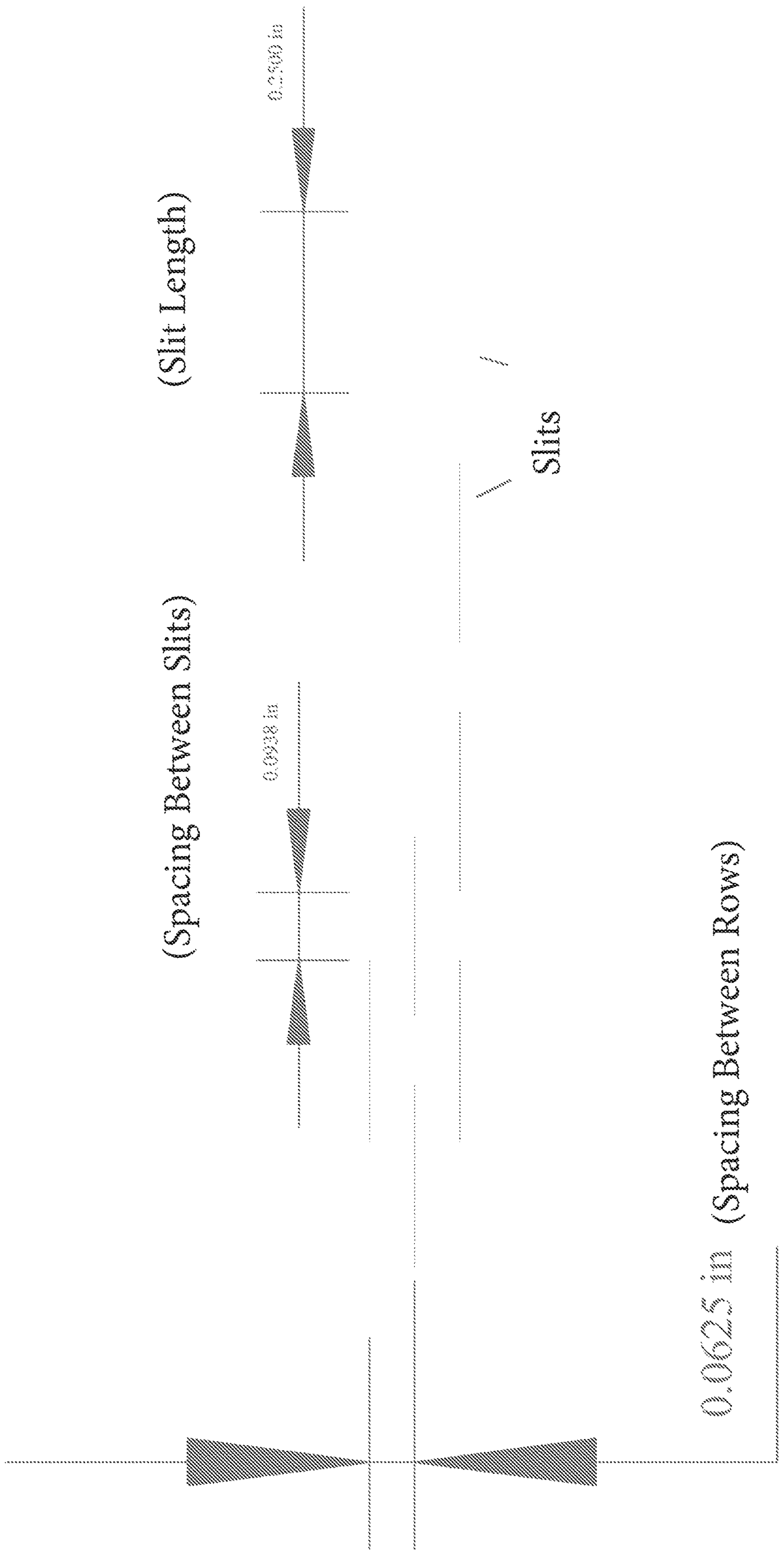
FIG. 10 is a schematic drawing showing an slit pattern according to some preferred embodiments, with illustrative dimensions depicted on the figure according to some preferred embodiments.

With reference to FIG. 10, FIG. 10 is a schematic drawing showing a slit pattern along the lines of Example I, highlighted above, according to some preferred embodiments, with illustrative dimensions depicted on the figure according to some preferred embodiments. According to some highly advantageous implementations, the embodiment shown in FIG. 10 can be employed within envelopes (such as, e.g., any of the envelopes described the present application). In some preferred embodiments, the embodiment shown in FIG. 10 can be employed as a single cushioning layer within an envelope, such that the envelope has a single cushioning layer formed by this Example I in an expanded state within both inner and outer walls of the envelope. Among other things, this embodiment shown in FIG. 10 provides substantial cushioning an reduced width in a highly optimized fashion. In the preferred embodiments, the slit sheet paper shown in FIG. 10 would be an extensible paper as described in various extensible embodiments herein.

In some preferred embodiments, the corresponding row spacings of the Examples A to L in the above Table A are substantially as shown in Table A. In some preferred embodiments, the row spacings of Examples A to L can be substantially as shown in Table A plus or minus 20%, or, more preferably, substantially as shown in Table A plus or minus 15%, or, more preferably, substantially as shown in Table A plus or minus 10%, or, more preferably, substantially as shown in Table A plus or minus 5%.

Furthermore, in some preferred embodiments, the corresponding row spacings of the Examples A to L in the above Table A are, more preferably, within a range that is the same or lower than the row spacings shown in Table A for the respective slit lengths; notably, with reduced slit length, there can be increased difficulty to open the cells, which difficulty is increased with larger row spacings. Accordingly, as the slit lengths are decreased, in some preferred embodiments, the row spacing decreases an extent that is proportionally the same or more than the proportional decrease in the slit length. Notably, while the present inventor discovered that slit lengths could be viably decreased by the use of extensible papers as described herein, the present inventor also noted that even with extensible papers reduction in slit lengths can increase difficulty to open cells in the event that row spacings are proportionally too large.

Although the preceding Table A shows row spacings that are substantially reduced well below the ⅛" (0.125 inch) row spacing of the background art, in some alternative embodiments, the row spacings for various embodiments of the invention (including that of, e.g., Examples A to L in the preceding Table) can still be larger. That is, while the present invention very advantageously enables such a reduced row spacing due to the greatly improved cushioning characteristics that enable the row spacing to be reduced (e.g., the reduction in cushioning resultant from reduced row spacing can be offset by the improved cushioning characteristics of the present invention), such a substantial reduction is not necessarily required, as long as the cell structure can be opened for expansion.

For example, in some alternative embodiments, any of the embodiments of the invention having slit lengths within a range of 0.40 to 0.25 can employ row spacings that are less than that of the existing art, such as, e.g., less than 0.125 inches, or, more preferably, less than 0.12 inches, or, more preferably, less than 0.115 inches, or, more preferably, less than 0.1125 inches, or, more preferably, less than 0.0875 inches, or, in some embodiments more preferably, less than 0.08 inches.

In some other alternative embodiments, the various embodiments of the invention shown in the preceding Table A can be modified such that:

a) the slit spacing (which is shown in Table A as approximately based on the formula SL=2.6667×SS), can be adapted to be based on the formula SL=K×SS, where K is a value between 2.4 and 3.3, or, more preferably, where K is a value between 2.5 and 3, or, more preferably, where K is a value between 2.6 and 2.8); and/or b) the row spacing (which is shown in Table A as approximately based on the row spacing being proportionally reduced by a ratio SL(new)/0.5, such as to be based on the formula RS(new)=0.125/0.5×SL(new) or RS(new)=0.25×SL(new)), can be adapted to be based on the formula RS(new)=Y×SL(new), where Y is a value between 0.2 to 0.4, or, more preferably, where Y is a value between 0.22 and 0.3, or, more preferably, where Y is a value between 0.23 and 0.27.

In some preferred embodiments, the slit paper pattern of slits advantageously has slits in the range from 0.2 to 0.3 inches (i.e., in the lengthwise dimension of the slits) and spaces between rows in the range from 0.06 to 0.7 inches (i.e., the distance between adjacent rows of slits). Preferably, the slit paper pattern of slits advantageously has slits of about 0.25 inches (i.e., in the lengthwise dimension of the slits) and spaces between rows of about 0.06 to about 0.065 inches (i.e., the distance between adjacent rows of slits) and most preferably spaces between rows of about 0.0625 inches.

In some preferred embodiments, the space between the slits of each row is preferably in the range from about 0.1 to about 0.09 inches and most preferably, the space between the slits of each row is about 0.094 inches.

In some embodiments, the foregoing dimensions can produce a slit pattern that creates more cells per square foot, provides crush resistance and resiliency for cushioning the items packed within an envelope while providing a thin envelope. In some example, a "thin envelope" is provided that has a distance between the outermost layers 904 and 902 of the envelope (see, e.g., FIG. 9) that employs a slit paper pattern of slits in the range from 0.2 to 0.3 inches (i.e., in the lengthwise dimension of the slits) and spaces between rows in the range from 0.06 to 0.7 inches (i.e., the distance between adjacent rows of slits).

In all of the embodiments of the present invention, the paper is, most preferably, an extensible paper. In various embodiments, the extensible paper is an extensible paper according to any of the embodiments or examples of extensible paper disclosed herein.

In various embodiments, the extendable paper can employ extensibility according to any of the embodiments described herein, including, e.g., any of the Example 1 to Example 72 described above. Moreover, the extendable paper can include features of any of the extensible papers described herein in relation to, e.g., opening forces required, paper weight or type, etc. However, as described herein, in embodiments that are to employ an alternating row expansion pattern, it is noted that the extensibility is adapted to achieve the alternating row expansion pattern as described herein.

In some illustrative examples, in some embodiments, an extensible paper is employed having an extensible range of 3 to 20% in the machine direction. In some illustrative examples, in some embodiments, an extensible paper is employed having an extensible range of 3 to 20% in the cross direction. In some illustrative examples, in some embodiments, an extensible paper is employed having an extensible range of 3 to 15% in the machine direction. In some illustrative examples, in some embodiments, an extensible paper is employed having an extensible range of 3 to 15% in the cross direction. In some illustrative examples, in some embodiments, an extensible paper is employed having an extensible range of 7 to 15% in the machine direction. In some illustrative examples, in some embodiments, an extensible paper is employed having an extensible range of 7 to 15% in the cross direction. In some illustrative examples, the extensible range is not less than 5% in both the machine direction and cross direction.

Moreover, in some illustrative examples, the slit sheet paper is an extensible slit sheet configured such that expansion is performed by applying an expansion force of 0.15 to 0.22 pounds per inch to form said open cells.

Moreover, in some illustrative examples, the slit sheet paper is an extensible slit sheet, wherein said slit sheet paper has a weight, prior to expansion, from about 30 to 50 pounds per 3,000 sq. ft. Notably, all of the embodiments of the invention described herein (e.g., the various slit patterns, including slit lengths, slit spacings, row spacings, etc.) can be employed in various implementations of papers with weights within this range in some embodiments, such as, e.g., on 30 # paper, 40 # paper, 50 # paper, and on any papers within this range. Moreover, in other embodiments, papers can be employed lower than this range of 30 # to 50 #, such as, e.g., 20 # or less, or larger than this range, such as, e.g., 60 # or more. However, in preferred embodiments, due to enhanced cushioning characteristics achieved, papers with lower weights can be employed while obtaining the same or even greater cushioning characteristics than prior expandable slit sheet papers.

As indicated above, with the present invention, expanded slit sheets can be created having greatly improved cushioning characteristics. The improvement in cushioning characteristics can be achieved due to one or more, or all of the following:

a) In the preferred embodiments, the use of an extensible paper enables an "easier opening" structure, which enables the creation of smaller cells, whereby the smaller cells advantageously lead to the formation of increased cell density and, hence, improved cushioning characteristics.
b) In some of the preferred embodiments, the use of an extensible paper enables the achievement of a novel "alternating row expansion pattern" which has substantially improved cushioning characteristics over prior expansion patterns.

As indicated above, with the present invention, novel and previously-unviable cushioning products can be created, such as, for example:

a) In some preferred embodiments, a novel envelope structure can be achieved having great advantages over existing envelope structures. For example, the present invention enables a substantially thinner cushioning expanded slit sheet (e.g., with substantially smaller row spacings) and also provides substantial cushioning with a single layer or with just a few layers. Accordingly, an envelope with much narrower width can be achieved, and with even just a single cushioning layer. Furthermore, the envelope can be made with lighter weight paper, resulting in an easier to use product (e.g., less stiff) and a lighter product (e.g., reduced shipping costs). Notably, the lighter product weight along with the narrower product width both advantageously lead to reduced shipping costs.
b) In some preferred embodiments, a novel cushioning wrap can be achieved having great advantages over existing cushioning wraps, such as, e.g., increased cushioning characteristics, enabling, e.g., reduction in layers of cushioning required in some applications, reduction in amount of cushioning required, and other advantages and benefits as described herein.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) “means for” or “step for” is expressly recited; b) a corresponding function is expressly recited; and c) structure, material or acts that support that structure are not recited. In this disclosure and during the prosecution of this application, the terminology “present invention” or “invention” may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology “embodiment” can be used to describe any aspect, feature, process or step, any combination thereof, and/or any portion thereof, etc. In some examples, various embodiments may include overlapping features. In this disclosure, the following abbreviated terminology may be employed: “e.g.” which means “for example.”

The use of individual numerical values is stated as approximations as though the values were preceded by the word “about”, “substantially”, or “approximately.” Similarly, the numerical values in the various ranges specified in this application, unless expressly indicated otherwise, are stated as approximations as though the minimum and maximum values within the stated ranges were both preceded by the word “about”, “substantially”, or “approximately.” In this manner, variations above and below the stated ranges can be used to achieve substantially the same results as values within the ranges. As used herein, the terms “about”, “substantially”, and “approximately” when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words “about”, “substantially”, or “approximately” will serve to broaden a particular numerical value or range. Thus, as a general matter, “about”, “substantially”, or “approximately” broaden the numerical value. Also, the disclosure of ranges is intended as a continuous range including every value between the minimum and maximum values plus the broadening of the range afforded by the use of the term “about”, “substantially”, or “approximately”. Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms “about”, “substantially”, and “approximately” should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A slit sheet paper cushioning product, comprising:

a slit sheet paper having a slit pattern including a plurality of slits extending in a cross direction that forms a plurality of open cells upon expansion in a machine direction, wherein said plurality of open cells include substantially hexagonal cells;

wherein each of said plurality of slits extends substantially parallel to the cross direction;

wherein each of said plurality of slits has a width within a range having a lower end of about 0.175 inches and having an upper end of 0.35 inches; and wherein said slit sheet paper is formed from a paper having a weight, prior to expansion, within a range of between about 30 to about 60 pounds per 3,000 square feet.

2. The slit sheep paper cushioning product of claim 1, wherein the slit width is 0.30 inches or less.

3. The slit sheep paper cushioning product of claim 1, wherein the slit width is 0.25 inches or less.

4. The slit sheet paper cushioning product of claim 1, wherein the lower end of the range is 0.175 inches plus or minus 15%.

5. The slit sheet paper cushioning product of claim 1, wherein the lower end of the range is 0.175 inches.

6. The slit sheep paper cushioning product of claim 1, wherein the slit length is 0.25 inches plus or minus 10%, the slit spacing is 0.09375 inches plus or minus 10% and the row spacing is 0.0625 inches plus or minus 10%.

7. The slit sheep paper cushioning product of claim 1, wherein the slit length is 0.25 inches plus or minus 5%, the slit spacing is 0.09375 inches plus or minus 5% and the row spacing is 0.0625 inches plus or minus 5%.

8. The slit sheet paper cushioning product of claim 1, wherein said slit sheet includes spaces between rows of slits in the range of 0.05 to 0.1 inches.

9. The slit sheet paper cushioning product of claim 1, wherein said slit sheet includes spaces between rows of slits smaller than 0.125 inches.

10. The slit sheet paper cushioning product of claim 1, wherein said slit sheet includes spaces between rows of slits smaller than 0.1125 inches.

11. The slit sheet paper cushioning product of claim 1, wherein said slit sheet includes spaces between rows of slits smaller than 0.0875 inches.

12. The slit sheet paper cushioning product of claim 1, wherein said slit sheet paper is formed from a paper having a weight, prior to expansion, within a range of between 30 pounds plus or minus 15% to 60 pounds plus or minus 15% per 3,000 square feet.

13. The slit sheet paper cushioning product of claim 1, wherein said slit sheet paper is formed from a paper having a weight, prior to expansion, within a range of between 30 to 60 pounds per 3,000 square feet.

14. The slit sheet paper cushioning product of claim 1, wherein said slit sheet paper is formed from a paper having a weight, prior to expansion, within a range of between about 40 to about 60 pounds per 3,000 square feet.

15. The slit sheet paper cushioning product of claim 1, wherein said slit sheet paper is formed from a paper having a weight, prior to expansion, within a range of between about 40 to about 50 pounds per 3,000 square feet.

16. The slit sheet paper cushioning product of claim 1, wherein said substantially hexagonal cells are bent at a central region such as to form a bent substantially hexagonal shape.

17. The slit sheet paper cushioning product of claim 1, wherein said slit sheet paper is made with an extensible paper.

18. The slit sheet paper cushioning product of claim 17, wherein said extensible paper is extensible in a machine direction in a range of at least 5%.

19. The slit sheet paper cushioning product of claim 17, wherein said extensible paper is extensible in a cross direction in a range of at least 5%.

20. The slit sheet paper cushioning product of claim 17, wherein said extensible paper is extensible in a machine direction in a range of at least 5% and in a cross direction in a range of at least 5%.

21. The slit sheet paper cushioning product of claim 17, wherein said extensible paper is extensible in a machine direction in a range of at least 6% and in a cross direction in a range of at least 6%.

22. The slit sheet paper cushioning product of claim 1, wherein said slit sheet paper is a roll of slit sheet paper.

23. The slit sheet paper cushioning product of claim 22, wherein said roll of slit sheet paper is supported on an expander device adapted to rotatably support the roll of slit sheet paper for manual removal and expansion of said slit sheet paper from said roll.

24. A method of using the slit sheet paper cushioning product of claim 23, including manually wrapping the slit sheet paper in an expanded state around an item such as to create a plurality of layers of the expanded slit sheet paper surrounding the item for cushioning.

25. The slit sheet paper cushioning product of claim 1, wherein said slit sheet paper is employed within a wall of an envelope for cushioning of the envelope.

26. The slit sheet paper cushioning product of claim 25, wherein said envelope includes a single layer of said slit sheet paper within the wall of the envelope for cushioning such as to reduce thickness of the wall.

27. The slit sheet paper cushioning product of claim 25, wherein said wall of said envelope includes an outer paper layer located on a first side of said slit sheet paper and an inner paper layer at a second side of said slit sheet paper.

* * * * *